(12) United States Patent
Koga et al.

(10) Patent No.: US 11,489,374 B2
(45) Date of Patent: Nov. 1, 2022

(54) ROTARY ELECTRIC MACHINE ARMATURE AND METHOD OF MANUFACTURING THE SAME

(71) Applicant: AISIN CORPORATION, Kariya (JP)

(72) Inventors: Kiyotaka Koga, Nishio (JP); Tomotsugu Sugihara, Okazaki (JP)

(73) Assignee: AISIN CORPORATION, Kariya (JP)

( * ) Notice: Subject to any disclaimer, the term of this patent is extended or adjusted under 35 U.S.C. 154(b) by 265 days.

(21) Appl. No.: 16/638,639

(22) PCT Filed: Sep. 20, 2018

(86) PCT No.: PCT/JP2018/034861
§ 371 (c)(1),
(2) Date: Feb. 12, 2020

(87) PCT Pub. No.: WO2019/059293
PCT Pub. Date: Mar. 28, 2019

(65) Prior Publication Data
US 2021/0135512 A1 May 6, 2021

(30) Foreign Application Priority Data

Sep. 20, 2017 (JP) .............................. JP2017-180635
Mar. 26, 2018 (JP) .............................. JP2018-058077

(51) Int. Cl.
*H02K 1/14* (2006.01)
*H02K 1/16* (2006.01)
(Continued)

(52) U.S. Cl.
CPC .............. *H02K 1/14* (2013.01); *H02K 1/165* (2013.01); *H02K 3/12* (2013.01); *H02K 3/28* (2013.01);
(Continued)

(58) Field of Classification Search
CPC ............ H02K 1/14; H02K 1/165; H02K 3/12; H02K 3/28; H02K 15/064; H02K 15/085; H02K 15/0068
(Continued)

(56) References Cited

U.S. PATENT DOCUMENTS 7,071,807 B1 7/2006 Herbert
2004/0021388 A1 2/2004 Wada et al.
(Continued)

FOREIGN PATENT DOCUMENTS

CN 106537732 A 3/2017
DE 1026841 B 3/1958
(Continued)

OTHER PUBLICATIONS

Dec. 25, 2018 International Search Report issued in International Patent Application No. PCT/JP2018/034861.
(Continued)

*Primary Examiner* — Ahmed Elnakib
(74) *Attorney, Agent, or Firm* — Oliff PLC

(57) ABSTRACT

A rotary electric machine armature that includes a cylindrical armature core and a coil wound around the armature core, wherein: the coil is formed by joining a plurality of segment conductors to each other; the segment conductors have respective conductor side portions that extend along the axial direction; the conductor side portions are provided with respective joint portions; the joint portions have respective facing surfaces; the joint portions of a pair of the segment conductors are joined to each other with the facing surfaces of the joint portions facing each other; and a facing surface of the facing surfaces is formed so as to have a portion that faces a radial direction and so as not to have portions that overlap each other as viewed in the radial direction over the entire facing surface.

13 Claims, 9 Drawing Sheets

(51) Int. Cl.
*H02K 3/12* (2006.01)
*H02K 3/28* (2006.01)
*H02K 15/06* (2006.01)
*H02K 15/085* (2006.01)

(52) U.S. Cl.
CPC ......... *H02K 15/064* (2013.01); *H02K 15/085* (2013.01)

(58) Field of Classification Search
USPC ................................................ 310/179–210
See application file for complete search history.

(56) References Cited

U.S. PATENT DOCUMENTS

| | | |
|---|---|---|
| 2005/0164528 A1 | 7/2005 | Furguth |
| 2006/0006756 A1 | 1/2006 | Wada et al. |
| 2009/0230808 A1 | 9/2009 | Tatebe |
| 2016/0172919 A1* | 6/2016 | Hattori ..................... H02K 3/12 310/208 |
| 2017/0040859 A1* | 2/2017 | Langlard .............. H02K 15/064 |
| 2020/0235647 A1* | 7/2020 | Koga ................... H02K 15/064 |
| 2020/0259381 A1* | 8/2020 | Koga ................... H02K 15/085 |
| 2020/0366146 A1* | 11/2020 | Koga ....................... H02K 3/12 |
| 2021/0036569 A1* | 2/2021 | Koga ..................... H02K 15/10 |
| 2021/0135512 A1* | 5/2021 | Koga ....................... H02K 3/28 |

FOREIGN PATENT DOCUMENTS

| | | |
|---|---|---|
| FR | 3020521 A1 | 10/2015 |
| JP | S58-112446 A | 7/1983 |
| JP | 2004-48890 A | 2/2004 |
| JP | 2006-158044 A | 6/2006 |
| JP | 2008-131826 A | 6/2008 |
| JP | 2015-023771 A | 2/2015 |
| JP | 2016-187245 A | 10/2016 |
| WO | 2015/011542 A2 | 1/2015 |

OTHER PUBLICATIONS

Jun. 18, 2020 Search Report issued in European Patent Application No. 18859904.7.

* cited by examiner

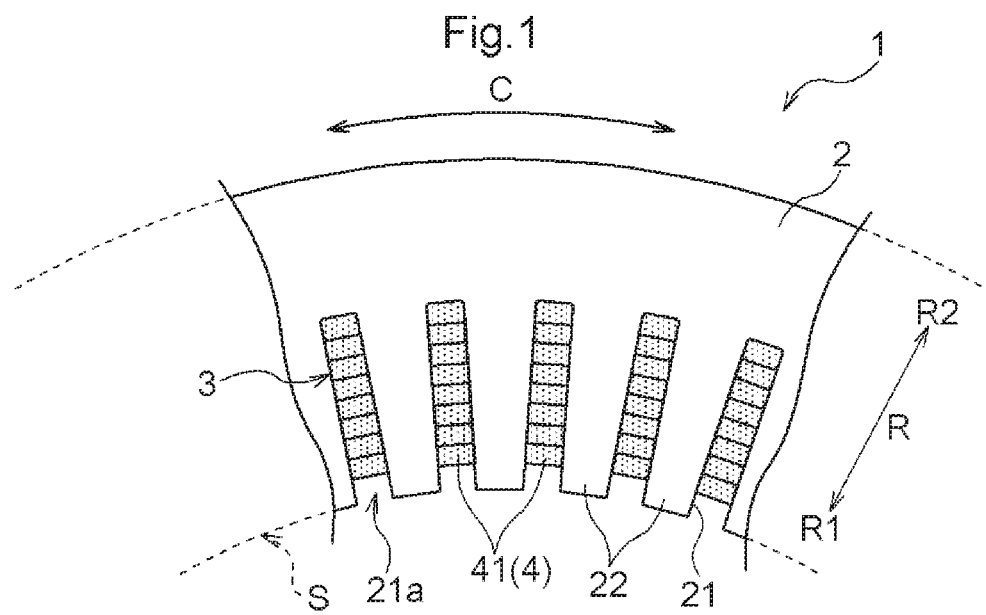
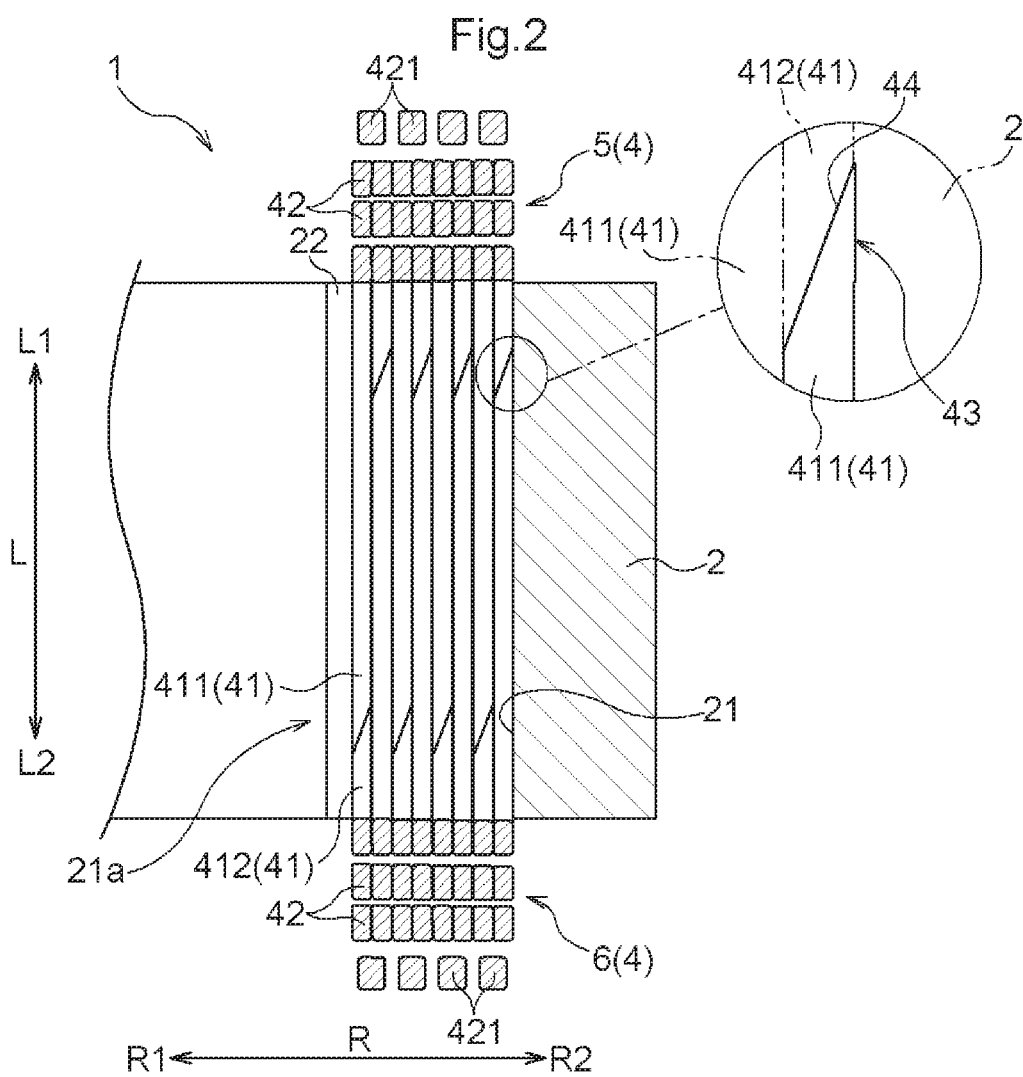

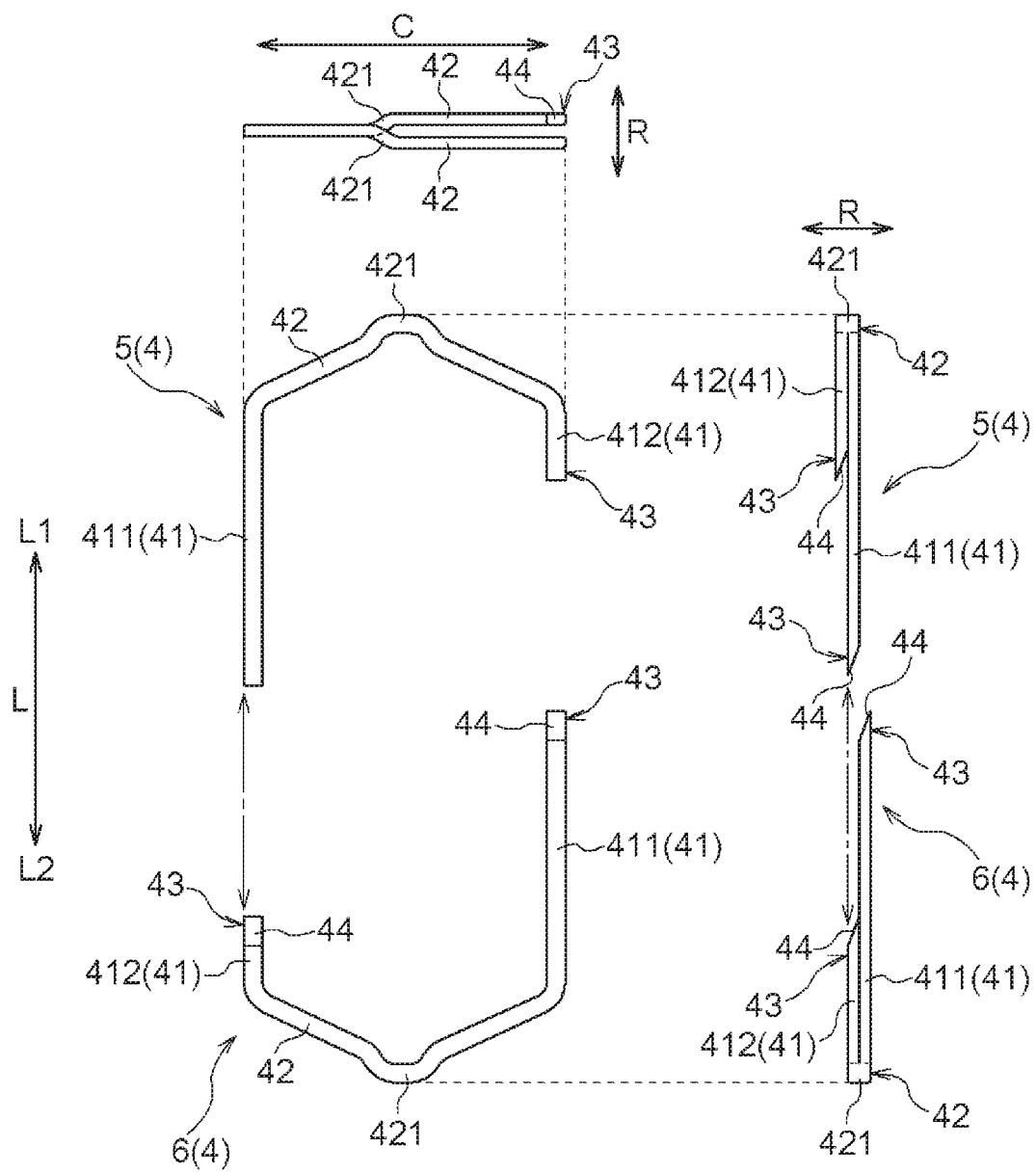

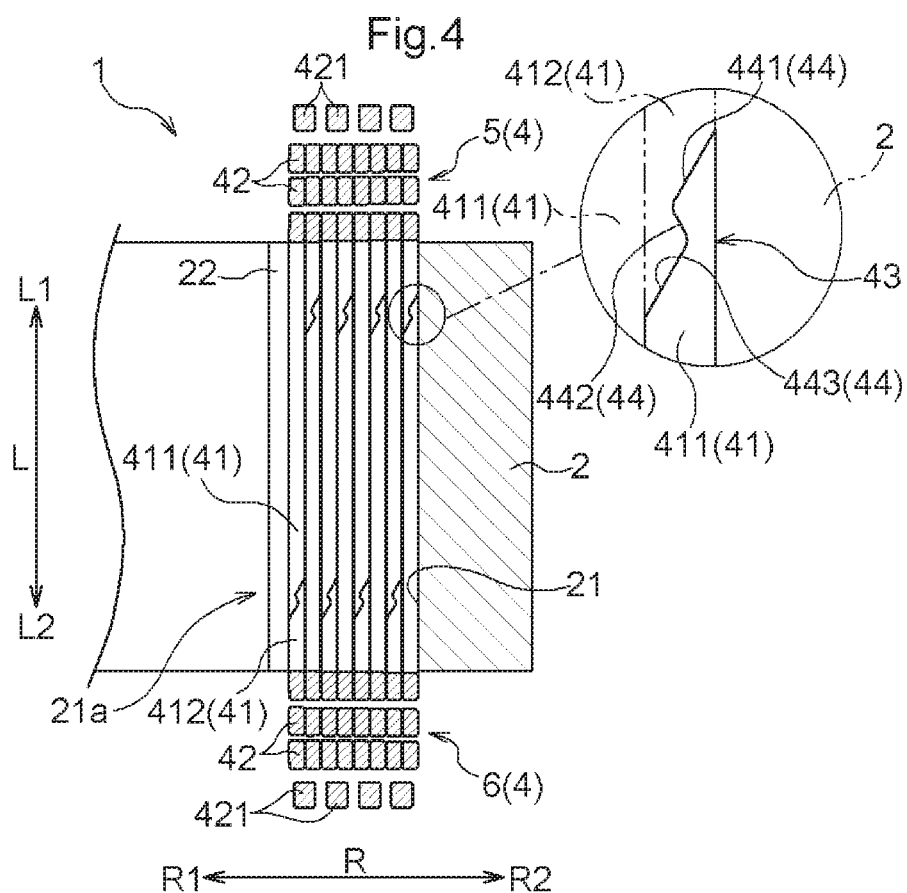
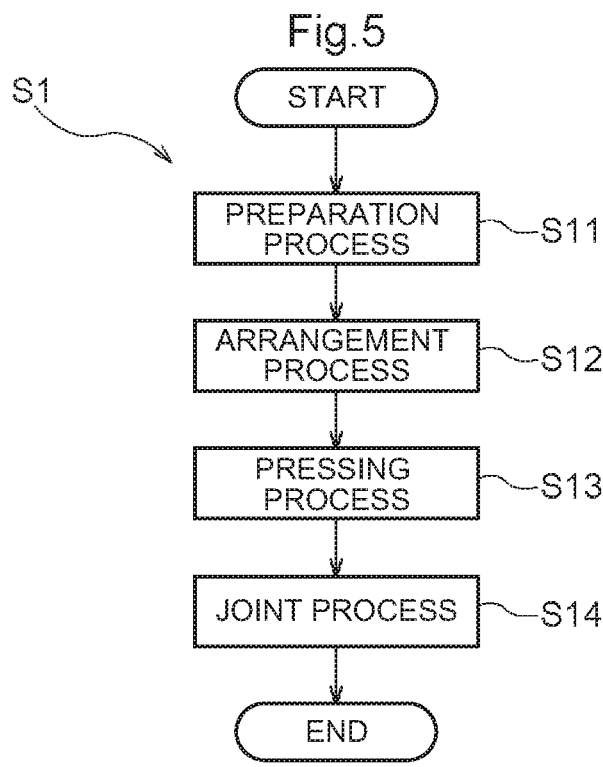

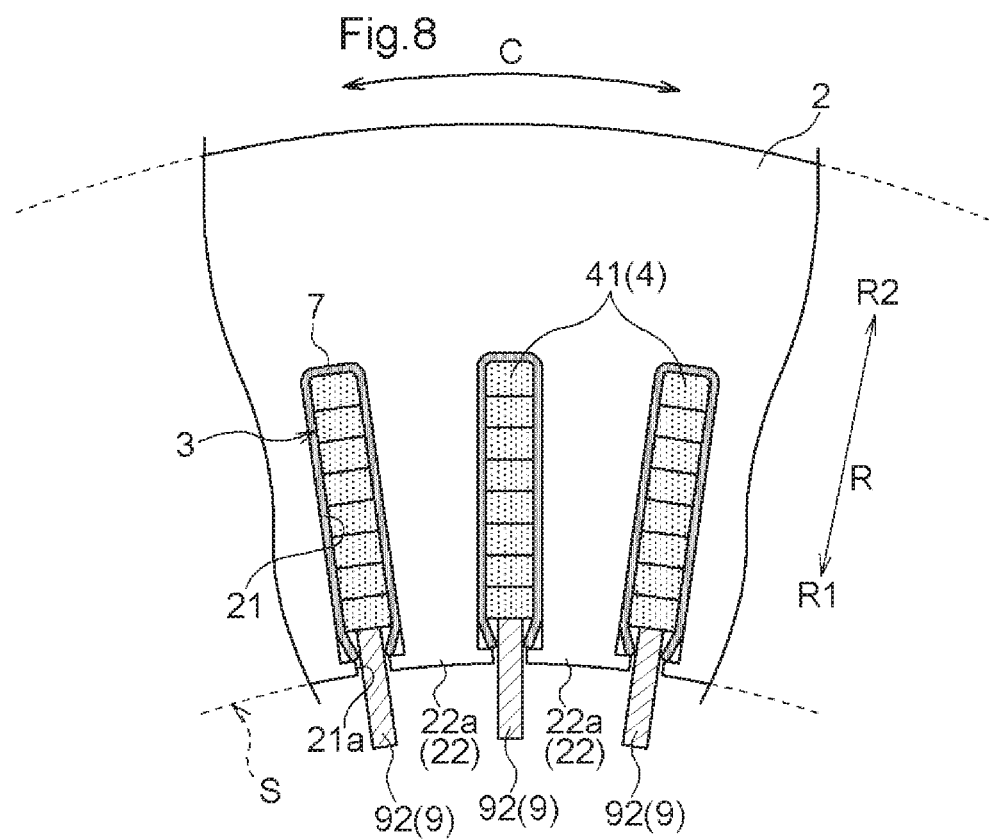
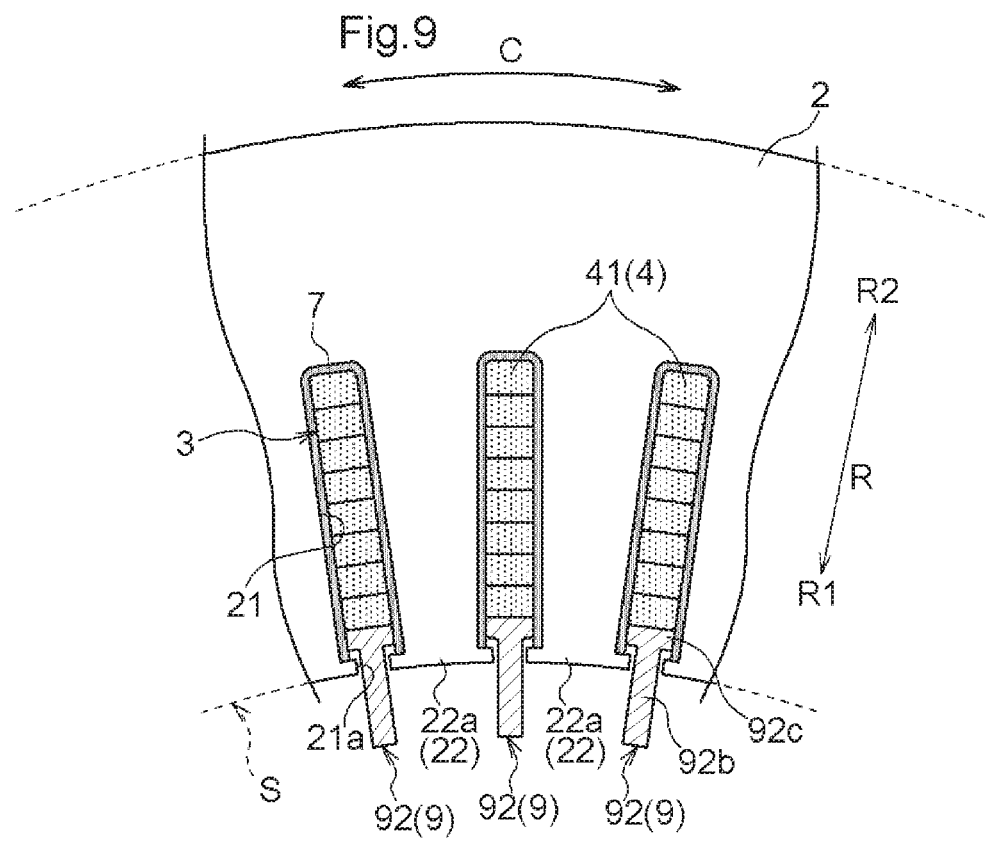

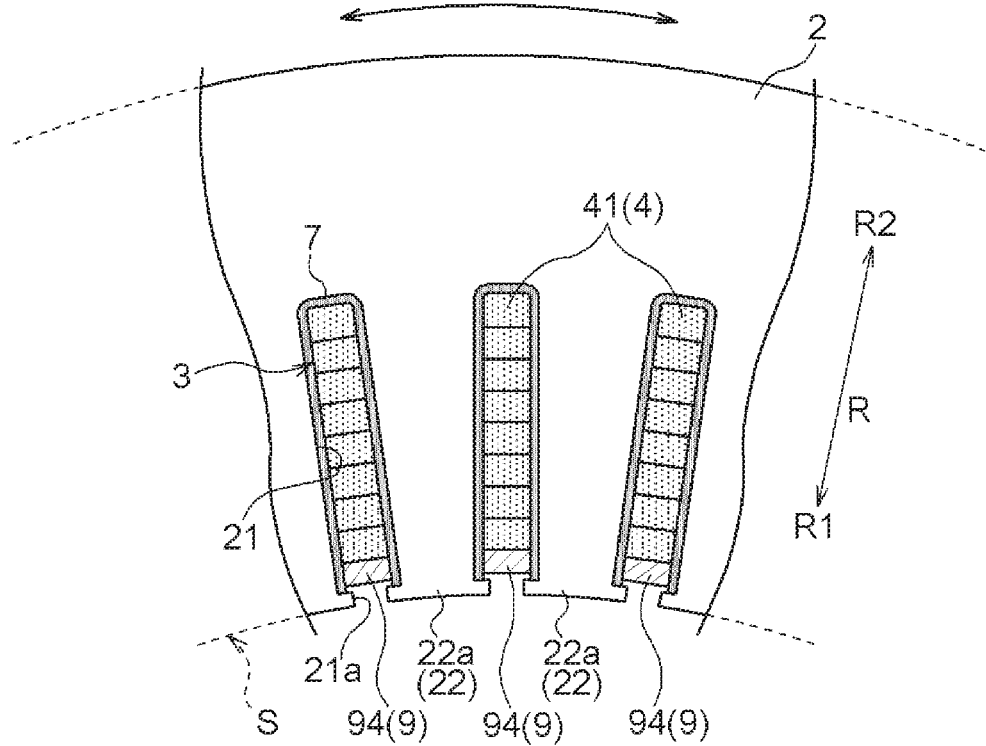
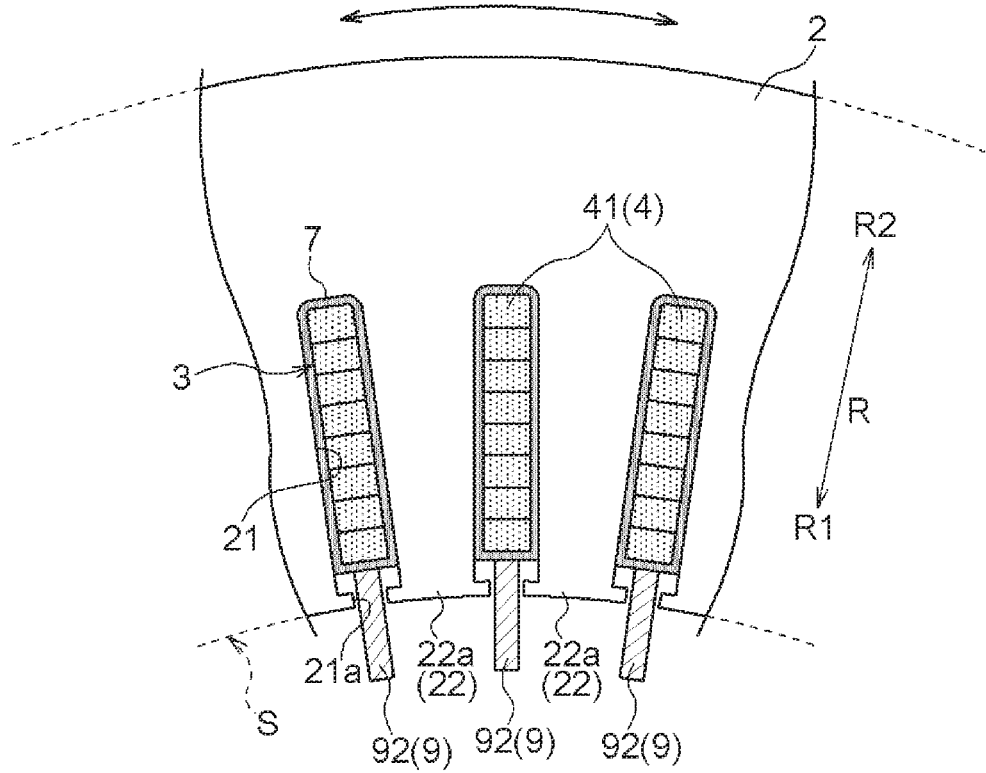

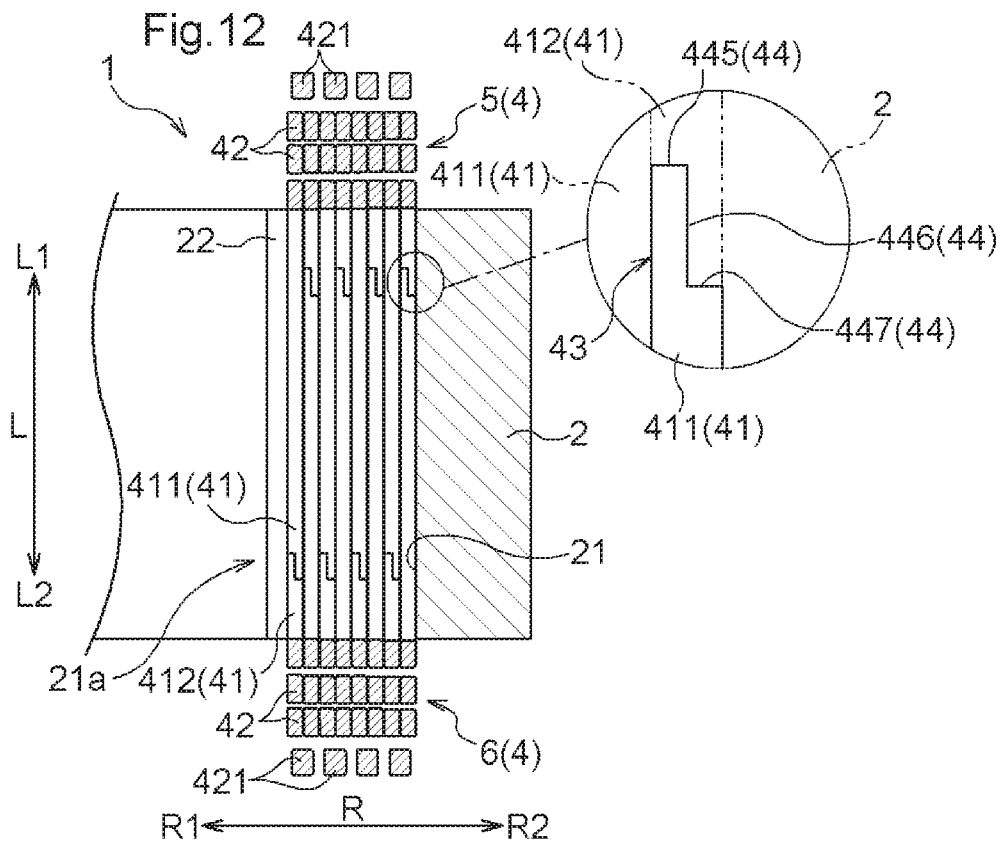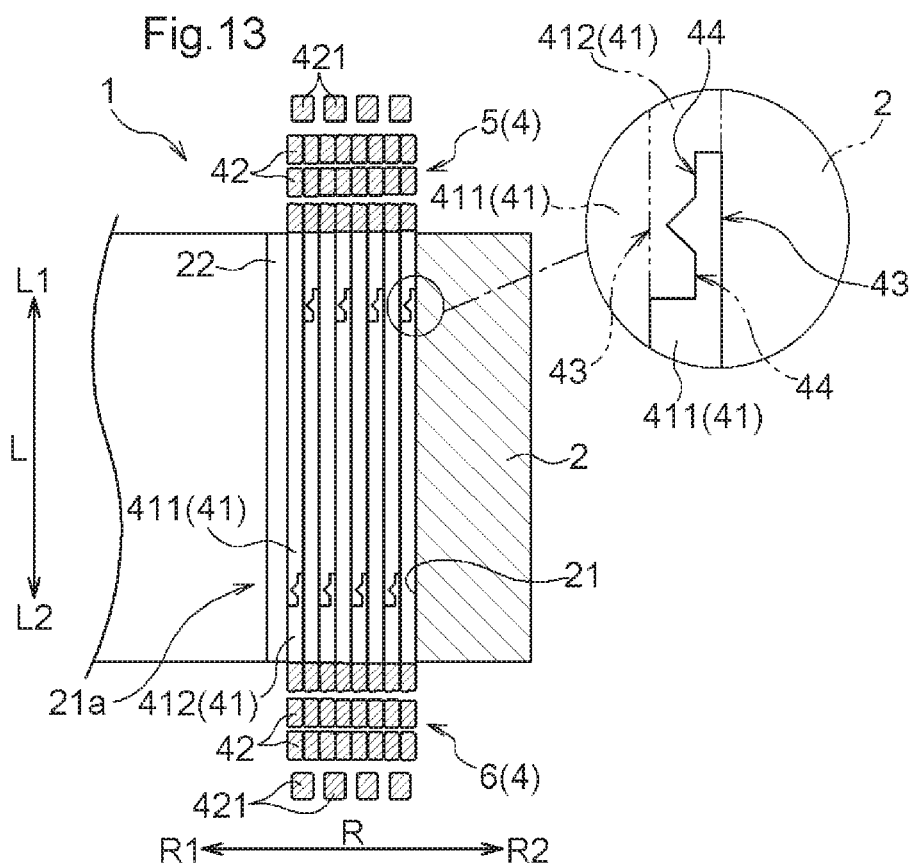

ROTARY ELECTRIC MACHINE ARMATURE AND METHOD OF MANUFACTURING THE SAME

BACKGROUND

The present disclosure relates to a rotary electric machine armature that includes a cylindrical armature core in which a plurality of slots that extend in the axial direction are disposed in the circumferential direction and a coil wound around the armature core.

There is already known a technique of constituting a coil of a rotary electric machine armature by joining a plurality of segment conductors to each other. For example, Japanese Patent Application Publication No. 2015-023771 discloses a rotary electric machine armature (stator 10) that includes a coil constituted by joining first segment conductors (first-side conductor segments 28) disposed on one side of an armature core (stator core 14) in the axial direction and second segment conductors (second-side conductor segments 29 and 30) disposed on the other side of the armature core (stator core 14) in the axial direction. In the rotary electric machine armature (stator 10) according to Japanese Patent Application Publication No. 2015-023771, projecting portions (projecting portions 60) are formed at the distal end portions of conductor side portions (first-side leg portions 32 and 33) of the first segment conductors (first-side conductor segments 28), and recessed portions (recessed portions 62) are formed at the distal end portions of conductor side portions (second-side leg portions 40 and 41) of the second segment conductors (second-side conductor segments 29 and 30). The first segment conductors (first-side conductor segments 28) and the second segment conductors (second-side conductor segments 29 and 30) are joined to each other by being heated while being pressed from both sides in the axial direction with the projecting portions (projecting portions 60) and the recessed portions (recessed portions 62) engaged with each other.

In the rotary electric machine armature (stator 10) according to Japanese Patent Application Publication No. 2015-023771, however, the segment conductors are pressed from both sides in the axial direction, and therefore only coils contact each other and it is difficult to position the segment conductors for joining. In addition, the joint is occasionally non-uniform because of a manufacturing error of the segment conductors themselves. Hence, it is difficult to appropriately join the first segment conductors (first-side conductor segments 28) and the second segment conductors (second-side conductor segments 29 and 30) to each other.

SUMMARY

Thus, it is desirable to achieve a technique that facilitates appropriately joining segment conductors to each other.

In view of the foregoing, the present disclosure provides a rotary electric machine armature with a characteristic configuration, that is, a rotary electric machine armature that includes a cylindrical armature core in which a plurality of slots that extend in an axial direction are disposed in a circumferential direction and a coil wound around the armature core, in which: the coil is formed by joining a plurality of segment conductors to each other; the segment conductors have respective conductor side portions that extend along the axial direction; the conductor side portions are provided with respective joint portions; the joint portions have respective facing surfaces; the joint portions of a pair of the segment conductors are joined to each other with the facing surfaces of the joint portions facing each other; and a facing surface of the facing surfaces is formed so as to have a portion that faces a radial direction and so as not to have portions that overlap each other as viewed in the radial direction over the entire facing surface.

With this characteristic configuration, the pair of segment conductors are shaped to be able to receive a load in the radial direction with the entire facing surfaces of the joint portions which are joined to each other. Therefore, the pair of segment conductors can be joined to each other by being pressed along the radial direction, rather than by being pressed in the axial direction. Hence, when the segment conductors are to be joined to each other, application of a non-uniform pressing force to the plurality of segment conductors can be suppressed and, further, application of a uniform pressing force to the plurality of segment conductors is facilitated. Hence, a rotary electric machine armature with a structure in which the segment conductors can be easily joined to each other appropriately can be achieved.

In view of the foregoing, the present disclosure provides a rotary electric machine armature with another characteristic configuration, that is, a rotary electric machine armature that includes a cylindrical armature core in which a plurality of slots that extend in an axial direction are disposed in a circumferential direction and a coil wound around the armature core, in which: the coil is formed by joining a plurality of segment conductors to each other; the segment conductors have respective conductor side portions that extend along the axial direction; the conductor side portions are provided with respective joint portions; the joint portions have respective facing surfaces; the joint portions of a pair of the segment conductors are joined to each other with the facing surfaces of the joint portions facing each other; one of the facing surfaces which face each other is formed of only a surface that faces one side in a radial direction; and the other of the facing surfaces which face each other is formed of only a surface that faces the other side in the radial direction.

With this characteristic configuration, the pair of segment conductors are shaped to be able to receive a load in the radial direction with the entire facing surfaces of the joint portions which are joined to each other. Therefore, the pair of segment conductors can be joined to each other by being pressed along the radial direction, rather than by being pressed in the axial direction. Hence, when the segment conductors are to be joined to each other, application of a non-uniform pressing force to the plurality of segment conductors can be suppressed and, further, application of a uniform pressing force to the plurality of segment conductors is facilitated. Hence, a rotary electric machine armature with a structure in which the segment conductors can be easily joined to each other appropriately can be achieved.

In view of the foregoing, the present disclosure provides a rotary electric machine armature with still another characteristic configuration, that is, a rotary electric machine armature that includes a cylindrical armature core in which a plurality of slots that extend in an axial direction are disposed in a circumferential direction and a coil wound around the armature core, in which: the coil is formed by joining a plurality of segment conductors to each other; the segment conductors have respective conductor side portions that extend along the axial direction; the conductor side portions are provided with respective joint portions; the joint portions have respective facing surfaces; the joint portions of a pair of the segment conductors are joined to each other with the facing surfaces of the joint portions facing each other; and the facing surface is formed so as to have a portion that faces a radial direction and so as not to have portions that overlap each other as viewed in the circumferential direction over the entire facing surface.

With this characteristic configuration, the pair of segment conductors are shaped to be able to receive a load in the radial direction with a relatively large range of the facing surfaces of the joint portions which are joined to each other. Therefore, the pair of segment conductors can be joined to each other by being pressed along the radial direction, rather than by being pressed in the axial direction. Hence, when the segment conductors are to be joined to each other, application of a non-uniform pressing force to the plurality of segment conductors can be suppressed and, further, application of a uniform pressing force to the plurality of segment conductors is facilitated. Hence, a rotary electric machine armature with a structure in which the segment conductors can be easily joined to each other appropriately can be achieved.

In view of the foregoing, the present disclosure provides a rotary electric machine armature with still another characteristic configuration, that is, a rotary electric machine armature that includes a cylindrical armature core in which a plurality of slots that extend in an axial direction are disposed in a circumferential direction and a coil wound around the armature core, in which: the coil is formed by joining a plurality of segment conductors to each other; the segment conductors have respective conductor side portions that extend along the axial direction; the conductor side portions are provided with respective joint portions; the joint portions have respective facing surfaces; the joint portions of a pair of the segment conductors are joined to each other with the facing surfaces of the joint portions facing each other; and the facing surface is formed so as to have a portion that faces a radial direction and so as not to have a portion projecting or dented in the axial direction in the facing surface.

With this characteristic configuration, the pair of segment conductors are shaped to be able to receive a load in the radial direction with the entire facing surfaces of the joint portions which are joined to each other. Therefore, the pair of segment conductors can be joined to each other by being pressed along the radial direction, rather than by being pressed in the axial direction. Hence, when the segment conductors are to be joined to each other, application of a non-uniform pressing force to the plurality of segment conductors can be suppressed and, further, application of a uniform pressing force to the plurality of segment conductors is facilitated. Hence, a rotary electric machine armature with a structure in which the segment conductors can be easily joined to each other appropriately can be achieved.

In view of the foregoing, the present disclosure provides a method of manufacturing a rotary electric machine armature with a characteristic configuration, that is, a method of manufacturing a rotary electric machine armature that includes a cylindrical armature core in which a plurality of slots that extend in an axial direction are disposed in a circumferential direction and a coil wound around the armature core, the slots having respective radial openings that open in a radial direction, and the coil being formed by joining a plurality of segment conductors to each other, the method including: preparing a plurality of the segment conductors and preparing the armature core, the segment conductors having respective conductor side portions extending along the axial direction and disposed in the slots and respective crossover portions disposed on an outer side of the armature core in the axial direction, the conductor side portions being provided with respective joint portions, and the joint portions having respective facing surfaces formed so as to have a portion that faces the radial direction; arranging, when the segment conductor, among the plurality of segment conductors, the crossover portion of which is disposed on one side in the axial direction with respect to the armature core, is defined as a first segment conductor and the segment conductor, the crossover portion of which is disposed on the other side in the axial direction with respect to the armature core, is defined as a second segment conductor, the conductor side portions of the first segment conductor and the conductor side portions of the second segment conductor in the slots such that the facing surface of one of the joint portions of the first segment conductor and the facing surface of one of the joint portions of the second segment conductor face each other in the radial direction; pressing a portion, at which the joint portions of the first segment conductor and the joint portions of the second segment conductor overlap each other as viewed in the radial direction, from the radial opening; and joining the joint portions of the first segment conductor and the joint portions of the second segment conductor to each other while maintaining a pressing state.

With this characteristic configuration, the first segment conductor and the second segment conductor can be joined to each other in the state of being pressed along the radial direction from the radial opening, rather than by being pressed in the axial direction. Therefore, when the segment conductors are to be joined to each other, application of a non-uniform pressing force to the plurality of segment conductors in the slots can be suppressed. Thus, the segment conductors can be easily joined to each other appropriately with a uniform pressing force applied to the plurality of segment conductors in the slots.

BRIEF DESCRIPTION OF THE DRAWINGS

FIG. 1 is a sectional view, taken along the radial direction, of a part of a rotary electric machine armature according to a first embodiment.

FIG. 2 is a sectional view, taken along the axial direction, of a part of the rotary electric machine armature according to the first embodiment.

FIG. 3 illustrates a pair of segment conductors.

FIG. 4 is a sectional view, taken along the axial direction, of a part of a rotary electric machine armature according to a second embodiment.

FIG. 5 is a flowchart illustrating a method of manufacturing the rotary electric machine armature according to the embodiment.

FIG. 8 illustrates a pressing process of a method of manufacturing a rotary electric machine armature according to a third embodiment.

FIG. 9 illustrates a pressing process of a method of manufacturing a rotary electric machine armature according to a fourth embodiment.

FIG. 10 illustrates a pressing process of the method of manufacturing the rotary electric machine armature according to the fourth embodiment.

FIG. 11 illustrates a pressing process of a method of manufacturing a rotary electric machine armature according to a fifth embodiment.

FIG. 12 is a sectional view, taken along the radial direction, of a part of a rotary electric machine armature according to another embodiment.

FIG. 13 is a sectional view, taken along the radial direction, of a part of a rotary electric machine armature according to still another embodiment.

DETAILED DESCRIPTION OF EMBODIMENTS

1. First Embodiment

Figure 6:
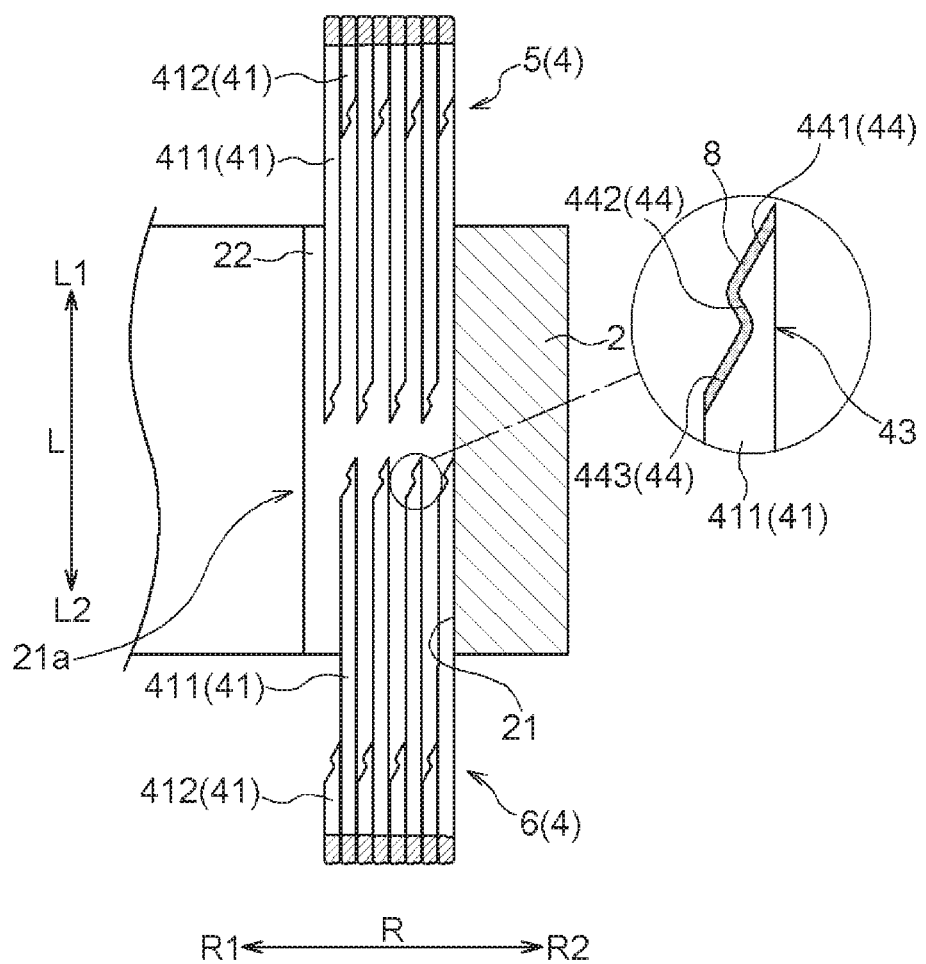
FIG. 6 illustrates an arrangement process of the method of manufacturing the rotary electric machine armature according to the second embodiment.

A rotary electric machine armature according to a first embodiment will be described with reference to the drawings. Here, the rotary electric machine armature is described as a stator 1 for a rotary electric machine of an inner rotor type.

Herein, the term "rotary electric machine" refers to any of a motor (electric motor), a generator (electric generator), and a motor generator that functions both as a motor and as a generator as necessary.

1-1. Overall Configuration of Stator

The overall configuration of the stator 1 according to the present embodiment will be described below with reference to FIGS. 1 and 2. As illustrated in FIGS. 1 and 2, the stator 1 includes a cylindrical stator core 2 and a coil 3 wound around the stator core 2.

In the following description, unless otherwise noted, a "radial direction R", an "axial direction L", and a "circumferential direction C" are defined with reference to a core reference surface S of the cylindrical stator core 2 to be discussed later. Further, a "radially inner side R1" indicates the inner side in the radial direction R of the core reference surface S, and a "radially outer side R2" indicates the outer side in the radial direction R of the core reference surface S. In addition, a "first axial side L1" which is one side in the axial direction L indicates the upper side in the axial direction L in FIG. 2, and a "second axial side L2" which is the other side in the axial direction L indicates the lower side in the axial direction L in FIG. 2.

While a state in which the coil 3 is wound around the stator core 2 (see FIGS. 1 and 2) is assumed in the following description, the terms "radial direction R", "axial direction L", and "circumferential direction C" are also used for the other states.

The stator core 2 is formed using a magnetic material, and functions as an "armature core". In the present embodiment, the stator core 2 is a laminated structure in which a plurality of annular electrical steel plates are laminated on each other in the axial direction L. The stator core 2 has a plurality of slots 21 that extend along the axial direction L and that are distributed in the circumferential direction C. The plurality of slots 21 are disposed at constant intervals along the circumferential direction C. A tooth 22 is formed between two slots 21 that are adjacent to each other in the circumferential direction C.

Here, the "core reference surface" of the cylindrical stator core 2 discussed above is an imaginary surface that serves as a reference for the arrangement and the configuration of the slots 21. In the present embodiment, as illustrated in FIG. 1, an imaginary cylindrical surface (core inner peripheral surface) including the end surfaces of a plurality of teeth 22 on the radially inner side R1 is defined as the core reference surface S. The outer peripheral surface of the stator core 2 may be defined as the core reference surface S.

The slots 21 are formed so as to penetrate the stator core 2 in the axial direction L. In the present embodiment, the slots 21 are formed so as to extend in parallel with the axial direction L, and such that an imaginary line (i.e. the center line in the width direction) that passes through the middle portion of each of the slots 21 in the circumferential direction C extends in parallel with the radial direction R. The slots 21 have respective radially opening portions 21a (radial openings) that open in the radial direction R. In the present embodiment, the radially opening portions 21a open toward the radially inner side R1.

In the present embodiment, the slots 21 are open slots. That is, the side surfaces of the slots 21 on both sides in the circumferential direction C are formed as flat surfaces that are continuous with the end portion on the radially inner side R1. In the present embodiment, in addition, the slots 21 are parallel slots, and the width of the slots 21 in the circumferential direction C is set to be uniform along the radial direction R. That is, the slots 21 are formed in a rectangular shape as seen in the axial direction L.

Although not illustrated, a rotor that includes permanent magnets or electromagnets to serve as a field is disposed on the radially inner side R1 of the stator 1 (stator core 2) so as to be rotatable relative to the stator 1, and rotated by a rotating magnetic field generated from the stator 1. That is, the stator 1 according to the present embodiment is a stator for a rotary electric machine of an inner rotor type and of a rotating field type.

1-2. Configuration of Coil

The configuration of the coil 3 will be described in detail below with reference to FIGS. 1 to 3. As illustrated in FIGS. 1 and 2, the coil 3 has an n-layer wound structure in which n conductor side portions 41 to be discussed later are arranged in the radial direction R. Here, n is an integer of two or more (e.g. an integer of two or more and ten or less; particularly preferably an even number of two or more), and is set in accordance with the magnitude of torque required from the rotary electric machine, an allowable counter-electromotive force, etc. In the present embodiment, the coil 3 has an eight-layer wound structure. In addition, the coil 3 has a structure in which at least one conductor side portion 41 is disposed in the circumferential direction C in each of the slots 21. In the present embodiment, one conductor side portion 41 is disposed in the circumferential direction C. That is, in the present embodiment, eight conductor side portions 41 are disposed in a row in each of the slots 21 so as to be stacked on each other in the radial direction R. Although not illustrated, a sheet-like insulating member is interposed between the coil 3 and the inner wall surfaces of the slots 21 in order to secure electrical insulation between the coil 3 and the stator core 2.

The coil 3 is formed by successively joining a plurality of segment conductors 4 to each other. The segment conductors 4 are constituted of a linear conductor with a rectangular cross-sectional shape, for example, taken along a plane that is orthogonal to the extension direction. The corner portions of the rectangular cross section of the linear conductor are preferably formed to be beveled, rounded, or otherwise chamfered as appropriate. Examples of a material that constitutes the linear conductor include copper and aluminum. In addition, the surface of the linear conductor is coated with an insulating film made of a resin etc. (such as polyimide, for example) except at portions (such as portions at which joint portions 43 to be discussed later are formed) for electrical connection with a different member.

Here, the configuration of the segment conductors 4 will be described with reference to FIG. 3. FIG. 3 illustrates a pair of segment conductors 4 joined to each other as viewed in the radial direction R, the axial direction L, and the circumferential direction C. The pair of segment conductors 4 as viewed in the radial direction R, the axial direction L, and the circumferential direction C are illustrated in the lower left, upper, and right portions, respectively, in FIG. 3.

In the following description, the segment conductor 4, a crossover portion 42 of which is disposed on the first axial side L1 with respect to the stator core 2, is defined as a first segment conductor 5, and the segment conductor 4, a crossover portion 42 of which is disposed on the second axial side L2 with respect to the stator core 2, is defined as a second segment conductor 6. In the case where the term "segment conductors 4" is used, both the first segment conductor 5 and the second segment conductor 6 are meant without distinction.

As illustrated in FIG. 3, the segment conductors 4 are formed in a U-shape as viewed in the radial direction R. The segment conductors 4 each have a pair of conductor side portions 41 and a crossover portion 42 that connects between the pair of conductor side portions 41. In the present embodiment, the pair of conductor side portions 41 have different lengths in the axial direction L. Therefore, in the following description, one of the pair of conductor side portions 41 that is longer in the axial direction L than the other is defined as a first conductor side portion 411, and the conductor side portion 41 that is shorter in the axial direction L than the first conductor side portion 411 is defined as a second conductor side portion 412. In the case where the term "conductor side portions 41" is used, both the first conductor side portion 411 and the second conductor side portion 412 are meant without distinction.

The conductor side portions 41 extend in the axial direction L in parallel with the slots 21. Joint portions 43 to be joined to different conductor side portions 41 are formed at the distal end portions of the conductor side portions 41, that is, the end portions thereof on the opposite side from the portions of connection with the crossover portion 42. The configuration of the joint portions 43 will be discussed in detail later.

The crossover portion 42 connects between the pair of conductor side portions 41. In the present embodiment, the crossover portion 42 of the first segment conductor 5 connects between the end portions, on the first axial side L1, of the pair of conductor side portions 41 of the first segment conductor 5, and the crossover portion 42 of the second segment conductor 6 connects between the end portions, on the second axial side L2, of the pair of conductor side portions 41 of the second segment conductor 6. An offset portion 421 that offsets the pair of conductor side portions 41 in the radial direction R is formed at the crossover portion 42. In the present embodiment, the offset portion 421 is formed at the middle portion of the crossover portion 42 in the circumferential direction C, and formed so as to offset the pair of conductor side portions 41 in the radial direction R by one layer. With the presence of the offset portion 421, the pair of conductor side portions 41 of the segment conductor 4 are adjacent to each other without overlapping each other as viewed in the circumferential direction C.

Here, when two members are described as being disposed to "overlap" each other, it is indicated that, when an imaginary line that is parallel to the viewing direction is moved in directions that are orthogonal to the imaginary line, there is a region in which the imaginary line crosses both of the two members.

In the present embodiment, the coil 3 is wound around the stator core 2 by lap winding. Therefore, as illustrated in FIG. 3, in the case where one first segment conductor 5 and one second segment conductor 6 are extracted, the joint portion 43 of the first conductor side portion 411 of the first segment conductor 5 and the joint portion 43 of the second conductor side portion 412 of the second segment conductor 6 are joined to each other. The second conductor side portion 412 of the first segment conductor 5 and the first conductor side portion 411 of the second segment conductor 6 are disposed at the same position in the circumferential direction C, and disposed at different positions in the radial direction R. In addition, the joint portion 43 of the second conductor side portion 412 of the first segment conductor 5 and the joint portion 43 of the first conductor side portion 411 of a different second segment conductor 6 (not illustrated) are joined to each other. Similarly, the joint portion 43 of the first conductor side portion 411 of the second segment conductor 6 and the joint portion 43 of the second conductor side portion 412 of a different first segment conductor 5 (not illustrated) are joined to each other.

In the present embodiment, as illustrated in FIG. 2, the conductor side portions 41 are disposed in the slot 21, and the crossover portions 42 are disposed on the outer sides of the stator core 2 in the axial direction L. In the present embodiment, the joint portions 43 of the first segment conductors 5 and the joint portions 43 of the second segment conductors 6 are joined to each other in the slot 21.

The joint portions 43 have respective facing surfaces 44. The facing surfaces 44 of the pair of joint portions 43 which are joined to each other are formed so as to face each other. The joint portions 43 and the facing surfaces 44 are formed such that, with the pair of facing surfaces 44 facing each other and with the joint portions 43 joined to each other, the pair of conductor side portions 41 (the first conductor side portion 411 and the second conductor side portion 412) in which the joint portions 43 are formed extend straight along the axial direction L.

The facing surface 44 is formed so as not to have portions that overlap each other as viewed in the radial direction R over the entire facing surface 44. In the present embodiment, the facing surfaces 44 are formed over the entire axial end surfaces of the distal end portions of the conductor side portions 41, and are flat surfaces that extend in a direction inclined with respect to the axial direction L. In addition, one of the facing surfaces 44 which face each other is constituted of only a surface that faces one side in the radial direction R, and the other of the facing surfaces 44 which face each other is constituted of only a surface that faces the other side in the radial direction R. In the present embodiment, the facing surface 44 of the first conductor side portion 411 is constituted of only a surface that faces the radially inner side R1, and the facing surface 44 of the second conductor side portion 412 is constituted of only a surface that faces the radially outer side R2. Here, the wording "the facing surface 44 is constituted of only a surface that faces one side in the radial direction R" means that the facing surface 44 does not include a surface that faces the other side in the radial direction R. The wording "surface that faces the other side in the radial direction R" refers to a surface, the normal vector of which has a component toward the other side in the radial direction R. In addition, the wording "the facing surface 44 is constituted of only a surface that faces the other side in the radial direction R" means that the facing surface 44 does not include a surface that faces one side in the radial direction R. The wording "surface that faces one side in the radial direction R" refers to a surface, the normal vector of which has a component toward one side in the radial direction R.

The facing surface 44 is also formed so as not to have portions that overlap each other as viewed in the circumferential direction C over the entire facing surface 44. In the present embodiment, the facing surfaces 44 are disposed in parallel with the circumferential direction C. In addition, the facing surfaces 44 are formed so as not to have a portion projecting or dented in the axial direction L in the facing surfaces 44. Here, the wording "the facing surfaces 44 do not have a portion projecting or dented in the axial direction L" means that the facing surfaces 44 do not have a projection or a recess in the axial direction L, and the facing surfaces 44 may be formed with a projection or a recess in the radial direction R or the circumferential direction C. Meanwhile, a projection or a recess in the axial direction L may be formed by portions other than the facing surfaces 44 or by the facing surface 44 and a portion other than the facing surface 44. The "facing surfaces 44 have a portion projecting or dented in the axial direction L" in the case where the inclination directions of portions of the facing surfaces 44 are opposite to each other in the axial direction L, such as a case where the inclination direction of a part of the facing surface 44 is a direction toward one side in the axial direction and the inclination direction of another part of the facing surface 44 is a direction toward the other side in the axial direction.

Each of the facing surfaces 44 is shaped to match the shape of the other of the facing surfaces 44 which face each other. In the present embodiment, the facing surfaces 44 which face each other have the same shape as each other, and are disposed in parallel with each other.

With the facing surfaces 44 configured as described above, the pair of segment conductors 4 can receive a load in the radial direction R with the entire facing surfaces 44 of the joint portions 43 which are joined to each other. In Japanese Patent Application Publication No. 2015-023771 discussed above, on the other hand, projecting portions (projecting portions 60) are formed at the distal end portions of conductor side portions (first-side leg portions 32 and 33) of the first segment conductors (first-side conductor segments 28), and recessed portions (recessed portions 62) are formed at the distal end portions of conductor side portions (second-side leg portions 40 and 41) of the second segment conductors (second-side conductor segments 29 and 30). Therefore, the first segment conductors (first-side conductor segments 28) and the second segment conductors (second-side conductor segments 29 and 30) can receive a load in the radial direction with only a relatively small range of the facing surfaces.

2. Second Embodiment

A rotary electric machine armature according to a second embodiment will be described below with reference to FIG. 4. In the present embodiment, the configuration of the facing surfaces 44 of the joint portions 43 of the segment conductors 4 is different from that according to the first embodiment described above. The differences from the first embodiment described above will be mainly described below. The same elements as those in the first embodiment described above will not be particularly described.

In the present embodiment, as illustrated in FIG. 4, the facing surfaces 44 are formed over the entire axial end surfaces of the distal end portions of the conductor side portions 41, and each include a first inclined surface 441, a second inclined surface 442, and a third inclined surface 443. The first inclined surface 441, the second inclined surface 442, and the third inclined surface 443 are disposed in this order from the distal end portion toward the base end portion of the conductor side portion 41 in the axial direction L. In the present embodiment, the facing surfaces 44 which face each other have the same shape as each other, and are disposed in parallel with each other. In the present example, in addition, all of the first inclined surface 441, the second inclined surface 442, and the third inclined surface 443 are disposed in parallel with the circumferential direction C.

The first inclined surface 441 is formed so as to extend along a direction inclined with respect to the axial direction L. In the present embodiment, the first inclined surface 441 is a flat surface formed to include the tip portion of the conductor side portion 41 and extending in a direction inclined with respect to the axial direction L.

The second inclined surface 442 is formed so as to extend along a direction that intersects the direction in which the first inclined surface 441 extends. In the present embodiment, the second inclined surface 442 is disposed between the first inclined surface 441 and the third inclined surface 443 in the axial direction L. The second inclined surface 442 is formed to be continuous with the first inclined surface 441, and forms a projecting portion projecting in the radial direction R together with the first inclined surface 441. Therefore, the second inclined surface 442 is a flat surface that extends in a direction inclined with respect to the axial direction L in a different direction from the first inclined surface 441. In addition, the second inclined surface 442 is formed so as to overlap the first inclined surface 441 as viewed in the axial direction L. In the present embodiment, the entire second inclined surface 442 overlaps the first inclined surface 441 as viewed in the axial direction L. In the present example, the first inclined surface 441 and the second inclined surface 442 are smoothly continuous with each other via a curved portion. However, the present disclosure is not limited thereto. It is also suitable if the first inclined surface 441 and the second inclined surface 442 are continuous by intersecting each other via an angled portion.

The third inclined surface 443 is formed so as to extend along a direction that intersects the direction in which the second inclined surface 442 extends. In the present embodiment, the third inclined surface 443 is disposed on the side of the base end portion with respect to the second inclined surface 442 in the axial direction L. The third inclined surface 443 is formed to be continuous with the second inclined surface 442, and forms a recessed portion dented in the radial direction R together with the second inclined surface 442. Therefore, the third inclined surface 443 is a flat surface that extends in a direction inclined with respect to the axial direction L in a different direction from the second inclined surface 442. Specifically, the third inclined surface 443 is a flat surface that extends in a direction that is parallel to the first inclined surface 441. Further, the length of the third inclined surface 443 in the extension direction is the same as the length of the first inclined surface 441 in the extension direction. In the present embodiment, the second inclined surface 442 and the third inclined surface 443 are smoothly continuous with each other via a curved portion. However, the present disclosure is not limited thereto. It is also suitable if the second inclined surface 442 and the third inclined surface 443 are continuous by intersecting each other via an angled portion.

In the present embodiment, with the pair of conductor side portions 41 joined to each other, the first inclined surface 441 of the first conductor side portion 411 and the third inclined surface 443 of the second conductor side portion 412 face each other, the second inclined surface 442 of the first conductor side portion 411 and the second inclined surface 442 of the second conductor side portion 412 face each other, and the third inclined surface 443 of the first conductor side portion 411 and the first inclined surface 441 of the second conductor side portion 412 face each other.

In the present embodiment, as described above, the facing surface 44 is formed so as not to have portions that overlap each other as viewed in the radial direction R and the circumferential direction C over the entire facing surface 44. In the present embodiment, in addition, the facing surface 44 of the first conductor side portion 411 is constituted of only a surface that faces the radially inner side R1, and the facing surface 44 of the second conductor side portion 412 is constituted of only a surface that faces the radially outer side R2. In the present embodiment, in addition, the facing surfaces 44 are formed so as not to have a portion projecting or dented in the axial direction L in the facing surfaces 44.

3. Method of Manufacturing Rotary Electric Machine Armature

Figure 7:
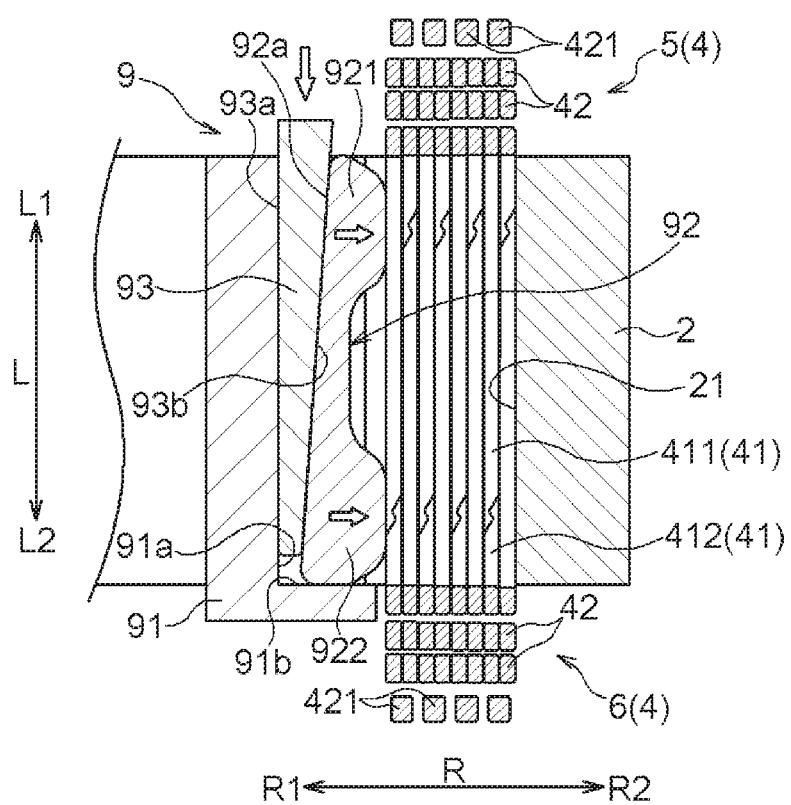
FIG. 7 illustrates a pressing process of the method of manufacturing the rotary electric machine armature according to the second embodiment.

A manufacturing process S1 for the stator 1, which is an embodiment of a method of manufacturing a rotary electric machine armature, will be described below with reference to FIGS. 5 to 7. The stator 1 according to the second embodiment described above (see FIG. 4) is manufactured in the manufacturing process S1 according to the present embodiment.

As illustrated in FIG. 5, the manufacturing process S1 includes a preparation process S11, an arrangement process S12, a pressing process S13, and a joint process S14.

In the preparation process S11, a plurality of segment conductors 4 that constitute a coil 3 and a stator core 2 are prepared. In the preparation process S11, a plurality of first segment conductors 5 and second segment conductors 6, the number of the second segment conductors 6 corresponding to the number of the first segment conductors 5, are prepared as the segment conductors 4.

In the arrangement process S12, the conductor side portions 41 of the plurality of segment conductors 4 are disposed in the slots 21. In the arrangement process S12, as illustrated in FIG. 6, the plurality of first segment conductors 5 and the plurality of second segment conductors 6 are disposed in the plurality of slots 21 such that the facing surface 44 of the first conductor side portion 411 of the first segment conductor 5 and the facing surface 44 of the second conductor side portion 412 of the second segment conductor 6 face each other and the facing surface 44 of the second conductor side portion 412 of the first segment conductor 5 and the facing surface 44 of the first conductor side portion 411 of a different second segment conductor 6 face each other in each of the slots 21. In the present embodiment, a process (joint material arrangement process) in which a conductive joint material 8 is disposed on at least one of the facing surfaces 44 which face each other is performed before the arrangement process S12. The conductive joint material 8 is a joint material that join the joint portions 43 of the pair of conductor side portions 41 to each other while securing conductivity. Examples of the conductive joint material 8 include a paste-like joint material containing silver nanoparticles.

In the pressing process S13, portions of the plurality of segment conductors 4 at which the pair of joint portions 43 to be joined to each other overlap each other as viewed in the radial direction R are pressed from the radially opening portion 21a. In other words, in the pressing process S13, a region in which the pair of facing surfaces 44 of the pair of joint portions 43 to be joined face each other as viewed in the radial direction R is pressed from the radially opening portion 21a. In the present embodiment, as illustrated in FIG. 7, the pressing process S13 is performed using a pressing device 9. The pressing device 9 includes a fixed member 91, a plurality of movable members 92, and an insertion member 93.

The fixed member 91 is formed in a cylindrical shape, and has an outside diameter that enables the fixed member 91 to be disposed on the radially inner side R1 with respect to the plurality of segment conductors 4 which are disposed in the slots 21. The fixed member 91 is disposed on the radially inner side R1 with respect to the core inner peripheral surface (core reference surface S) in the stator core 2 so as to be coaxial with the stator core 2, and fixed to the stator core 2. The fixed member 91 has an outer peripheral surface 91a that extends along the axial direction L over the entire region in the circumferential direction C, and a bottom surface 91b that extends from an end portion of the outer peripheral surface 91a on the second axial side L2 toward the radially outer side R2. In the present embodiment, the outer peripheral surface 91a of the fixed member 91 is formed in a cylindrical shape, and the bottom surface 91b is formed in a circular plate shape.

The pressing device 9 includes movable members 92, the number of movable members 92 being the same as that of the slots 21 of the stator core 2. The movable members 92 are each formed in a plate shape. All the movable members 92 are disposed radially with reference to the axis of the stator core 2 in correspondence with the slots 21 of the stator core 2. In addition, the movable members 92 are inserted into the respective slots 21 from the respective radially opening portions 21a of the slots 21. In this event, the movable members 92 are each disposed such that a part of the movable member 92 on the radially inner side R1 projects toward the radially inner side R1 with respect to the radially opening portion 21a of the slot 21. In addition, the movable members 92 are placed on the bottom surface 91b of the fixed member 91. Further, the movable member 92 has an inner peripheral-side inclined surface 92a. The inner peripheral-side inclined surface 92a is an inclined surface formed on the radially inner side R1 of the movable member 92 to extend toward the radially inner side R1 from the first axial side L1 toward the second axial side L2.

The movable member 92 also has a first pressing portion 921 and a second pressing portion 922. The first pressing portion 921 and the second pressing portion 922 are formed on a surface of the movable member 92 on the radially outer side R2. The first pressing portion 921 is formed so as to project toward the radially outer side R2 with respect to portions on both sides in the axial direction L, and disposed in accordance with the position, in the axial direction L, of a portion at which the joint portion 43 of the second conductor side portion 412 of the first segment conductor 5 and the joint portion 43 of the first conductor side portion 411 of the second segment conductor 6 overlap each other as viewed in the radial direction R. The second pressing portion 922 is formed so as to project toward the radially outer side R2 with respect to portions on both sides in the axial direction L, and disposed in accordance with the position, in the axial direction L, of a portion at which the joint portion 43 of the first conductor side portion 411 of the first segment conductor 5 and the joint portion 43 of the second conductor side portion 412 of the second segment conductor 6 overlap each other as viewed in the radial direction R. In the present embodiment, respective portions of the first pressing portion 921 and the second pressing portion 922 that project most toward the radially outer side R2 are each shaped as a flat surface that is parallel to the axial direction L.

The insertion member 93 is formed in a cylindrical shape, and inserted into a space in the radial direction R between the fixed member 91 and the movable members 92. The insertion member 93 has an inner peripheral surface 93a and an outer peripheral-side inclined surface 93b. The inner peripheral surface 93a of the insertion member 93 is formed along the outer peripheral surface 91a of the fixed member 91. Here, the inner peripheral surface 93a is a cylindrical surface that has an inside diameter that is slightly larger than the diameter of the outer peripheral surface 91a of the fixed member 91. Meanwhile, the outer peripheral-side inclined surface 93b of the insertion member 93 is a truncated cone surface formed such that the inclination angle thereof with respect to the axial direction L is the same as the angle of the inner peripheral-side inclined surfaces 92a of the movable members 92. In addition, the thickness of the insertion member 93 in the radial direction R is set such that the lower end portion of the insertion member 93 which contacts the inner peripheral-side inclined surfaces 92a of the movable members 92 does not abut against the bottom surface 91b of the fixed member 91 with the movable members 92 moved most to the radially outer side R2 within the movable range thereof.

In the pressing process S13, the movable members 92 are moved toward the radially outer side R2 along the bottom surface 91b of the fixed member 91 by inserting the insertion member 93 from the first axial side L1 into a space in the radial direction R between the fixed member 91 and the plurality of movable members 92 which are disposed radially. Consequently, the first pressing portion 921 and the second pressing portion 922 of the movable member 92 press the pair of conductor side portions 41 positioned most on the radially inner side R1 in the slot 21 from the radially inner side R1 (i.e. from the radially opening portion 21a of the slot 21). Further, with the movable member 92 moved toward the radially outer side R2, all the plurality of segment conductors 4 disposed in each of the slots 21 are pressed between the movable member 92 and the inner wall surface of the slot 21 on the radially outer side R2. In this way, in the pressing process S13 according to the present embodiment, the joint portions 43 of all the segment conductors 4 in all the slots 21 can be pressed using the pressing device 9. In this event, the pair of conductor side portions 41 to be joined to each other are disposed straight along the axial direction L, and therefore a pressing force applied by the first pressing portion 921 and a pressing force applied by the second pressing portion 922 are unlikely to be non-uniform.

In the joint process S14, the joint portion 43 of the first segment conductor 5 and the joint portion 43 of the second segment conductor 6 are joined to each other while maintaining the pressing state in the pressing process S13 discussed above. In the present embodiment, the paste-like joint material containing silver nanoparticles discussed above is adopted as the conductive joint material 8. Therefore, in the joint process S14, the joint portion 43 of the first segment conductor 5 and the joint portion 43 of the second segment conductor 6 are joined to each other by heating and melting the conductive joint material 8 using a heater etc., for example. The pair of joint portions 43 may be joined to each other by a different method, although not described in detail.

4. Third Embodiment

A third embodiment will be described below with reference to FIG. 8. In the present embodiment, the configuration of the slots 21 of the stator core 2 is different from that according to the first embodiment described above and the second embodiment described above. The differences from the first embodiment described above and the second embodiment described above will be mainly described below. The same elements as those in the first embodiment described above and the second embodiment described above will not be particularly described.

In the present embodiment, as illustrated in FIG. 8, the slots 21 are semi-open slots. Specifically, the width of the radially opening portion 21a in the circumferential direction C is smaller than the width, in the circumferential direction C, of a region of the slot 21 in which the conductor side portions 41 are disposed. In other words, projecting portions that project toward both sides in the circumferential direction C are formed at distal end portions 22a of the teeth 22.

A sheet-like insulating member 7 is provided in each of the slots 21 in order to secure electrical insulation between the coil 3 and the stator core 2. Specifically, the insulating member 7 is interposed between the conductor side portions 41 and the inner wall surface of the slot 21.

In the following, for convenience of description, all of the conductor side portions 41 in each of the slots 21 will be referred to as a "conductor side portion group".

In the present embodiment, the insulating member 7 is disposed so as to cover the side surfaces of the conductor side portion group on both sides in the circumferential direction C (surfaces that face the inner wall surfaces of the slot 21 on both sides in the circumferential direction C) and the side surface of the conductor side portion group on the radially outer side R2 (a surface that faces the inner wall surface of the slot 21 on the radially outer side R2). In other words, in the present embodiment, the insulating member 7 is disposed so as to cover all the side surfaces of the conductor side portion group excluding the side surface thereof on the side of the radially opening portion 21a (radially inner side R1). In addition, the insulating member 7 is longer in the axial direction L than the slot 21, although not illustrated. Hence, the insulating member 7 is disposed so as to project in the axial direction L from both end portions of the slot 21 in the axial direction L. Further, in the present example, as illustrated in FIG. 8, the insulating member 7 has portions that extend toward the radially opening portion 21a from portions that contact the side surfaces of the conductor side portion group on both sides in the circumferential direction C. Such portions are eventually folded to be disposed so as to cover the side surface of the conductor side portion group on the side of the radially opening portion 21a (radially inner side R1).

As illustrated in FIG. 8, the pressing process S13 of the manufacturing process S1 for the stator 1 according to the present embodiment is performed using a pressing device 9 that includes a plurality of movable members 92, the width of which in the circumferential direction C is smaller than that of the radially opening portions 21a. The movable members 92 according to the present embodiment are the same as those used in the pressing process S13 according to the second embodiment discussed above except for the width in the circumferential direction C. In the pressing process S13 according to the present embodiment, the movable members 92 are inserted into the radially opening portions 21a from the radially inner side R1. Then, the conductor side portion groups are pressed by the movable members 92 from the radially opening portions 21*a* toward the radially outer side R2.

5. Fourth Embodiment

A fourth embodiment will be described below with reference to FIG. 9. The present embodiment is different from the third embodiment described above in the configuration of the movable members 92. The differences from the third embodiment described above will be mainly described below. The same elements as those in the third embodiment described above will not be particularly described.

As illustrated in FIG. 9, the pressing process S13 according to the present embodiment is performed using a pressing device 9 that includes a plurality of movable members 92 that each have a narrow portion 92*b* and a wide portion 92*c*. The movable members 92 according to the present embodiment each have the narrow portion 92*b* and the wide portion 92*c*. The movable members 92 are otherwise the same in configuration as those used in the pressing process S13 according to the second embodiment discussed above. The width of the narrow portion 92*b* in the circumferential direction C is smaller than the width of the radially opening portion 21*a* in the circumferential direction C. The width of the wide portion 92*c* in the circumferential direction C is larger than the width of the radially opening portion 21*a* in the circumferential direction C, and smaller than the width, in the circumferential direction C, of a region of the slot 21 in which the conductor side portions 41 are disposed. In addition, the length of the wide portion 92*c* in the radial direction R is less than the distance between the conductor side portion group and the radially opening portion 21*a* (the projecting portions which are formed at the distal end portions 22*a* of the teeth 22 to project in the circumferential direction C). The wide portion 92*c* is disposed at an end portion of the narrow portion 92*b* on the radially outer side R2. The wide portion 92*c* has a shape that matches the space between the radially opening portion 21*a* and the conductor side portion group in the slot 21.

In the pressing process S13 according to the present embodiment, the movable members 92 are inserted into the slots 21 along the axial direction L such that the narrow portion 92*b* is positioned in the radially opening portion 21*a* and the wide portion 92*c* is positioned in the space between the radially opening portion 21*a* and the conductor side portion group in the slot 21. Then, the conductor side portion groups are pressed by the movable members 92 toward the radially outer side R2. In this event, in the present example, as illustrated in FIG. 9, portions of the insulating member 7 positioned between the radially opening portion 21*a* and the conductor side portion group extend along portions of the inner wall surfaces of the slot 21 in the circumferential direction C not faced by the conductor side portion group.

In the pressing process S13 according to the present embodiment, as illustrated in FIG. 10, a pressing device 9 that includes a plurality of inner pressing members 94 may be used in place of the pressing device 9 which includes the plurality of movable members 92 discussed above. The shape of a portion of the inner pressing member 94 to be inserted into the slot 21 is similar to the shape of the movable member 92 discussed above from which the narrow portion 92*b* has been removed and which includes only the wide portion 92*c*. The inner pressing member 94 is longer in the axial direction L than the stator core 2. The inner pressing member 94 is inserted into the space between the radially opening portion 21*a* and the conductor side portion group in the slot 21 along the axial direction L. Consequently, the inner pressing member 94 is disposed such that both end portions thereof in the axial direction L project toward both sides in the axial direction L (the first axial side L1 and the second axial side L2) from the stator core 2. The inner pressing member 94 is moved toward the radially outer side R2 with both end portions of the inner pressing member 94 in the axial direction L grasped by a grasping device (not illustrated). In this way, the conductor side portion groups are pressed by the inner pressing members 94 toward the radially outer side R2 without passing through the radially opening portions 21*a*. Such a pressing device 9 does not include the fixed member 91 and the insertion member 93 (see FIG. 7) discussed above, and includes the plurality of inner pressing members 94 and the grasping device. Also in the present embodiment, the pressing device 9 which includes the plurality of movable members 92, the width of which in the circumferential direction C is smaller than that of the radially opening portions 21*a*, may be used as in the third embodiment described above.

6. Fifth Embodiment

A fifth embodiment will be described below with reference to FIG. 11. The present embodiment is different from the third embodiment described above in the state of the insulating member 7 during the pressing process S13. The differences from the third embodiment described above will be mainly described below. The same elements as those in the third embodiment described above will not be particularly described.

In the present embodiment, as illustrated in FIG. 11, the insulating member 7 is disposed so as to cover all the side surfaces of the conductor side portion group. Here, a portion of the insulating member 7 that covers the side surface of the conductor side portion group on the side of the radially opening portion 21*a* is constituted by folding portions of the insulating member 7 that extend from portions that contact the side surfaces of the conductor side portion group on both sides in the circumferential direction C toward the radially opening portion 21*a* in a direction along the side surface of the conductor side portion group on the side of the radially opening portion 21*a*. In this portion, portions of the insulating member 7 on both sides in the circumferential direction C may be disposed so as to overlap each other, or the end portions of the insulating member 7 on both sides in the circumferential direction C may be disposed so as to contact each other. In the pressing process S13 according to the present embodiment, as illustrated in FIG. 11, the pressing device 9 which includes the plurality of movable members 92 according to the third embodiment described above is used. The pressing device 9 described in relation to the fourth embodiment described above may also be used.

7. Other Embodiments (1) In the embodiments described above, the facing surfaces 44 which are each a single inclined surface are formed at the joint portions 43 of the conductor side portions 41 (first embodiment), or the facing surfaces 44 which each include the first inclined surface 441, the second inclined surface 442, and the third inclined surface 443 are formed at the joint portions 43 of the conductor side portions 41 (second embodiment), for example. However, the facing surfaces 44 can also be shaped differently from those according to the embodiments described above, as described below.

For example, the facing surfaces 44 may be shaped as illustrated in FIG. 12. The facing surfaces 44 illustrated in FIG. 12 each include a first orthogonal surface 445 and a second orthogonal surface 447 that extend along the radial direction R, that is, a direction that is orthogonal to the extension direction of the conductor side portions 41, and a parallel surface 446 that extends along the axial direction L, that is, a direction that is parallel to the extension direction of the conductor side portions 41. The first orthogonal surface 445, the parallel surface 446, and the second orthogonal surface 447 are disposed in this order from the distal end portion toward the base end portion of the conductor side portion 41 in the axial direction L, and formed to be continuous with adjacent surfaces. In the present embodiment, the facing surface 44 of the first conductor side portion 411 does not have a surface that faces the radially inner side R1 and therefore is constituted of only a surface that faces the radially outer side R2, and the facing surface 44 of the second conductor side portion 412 does not have a surface that faces the radially outer side R2 and therefore is constituted of only a surface that faces the radially inner side R1. Also in the present embodiment, the facing surfaces 44 which face each other have the same shape as each other, and are disposed in parallel with each other.

Alternatively, as illustrated in FIG. 13, the facing surfaces 44 which face each other may be shaped differently from each other. Also in this case, it is suitable if the pair of facing surfaces 44 which face each other are formed with a projection and a recess corresponding to each other, and the projection and the recess are engaged with each other to have a positioning function and a function of regulating separation in the axial direction L. In the example illustrated in FIG. 13, the facing surfaces 44 are formed with a portion that projects in the radial direction R or a portion dented in the radial direction R. Such a projection and a recess are not a projection and a recess in the axial direction L. Thus, also in this case, the facing surfaces 44 are considered not to have a portion projecting or dented in the axial direction L.

(2) In the embodiments described above, the joint portions 43 of the first segment conductors 5 and the joint portions 43 of the second segment conductors 6 are joined to each other in the slot 21. However, the joint portions 43 of the first segment conductors 5 and the joint portions 43 of the second segment conductors 6 may be joined to each other outside the slot 21 as described below.

Figure 14:
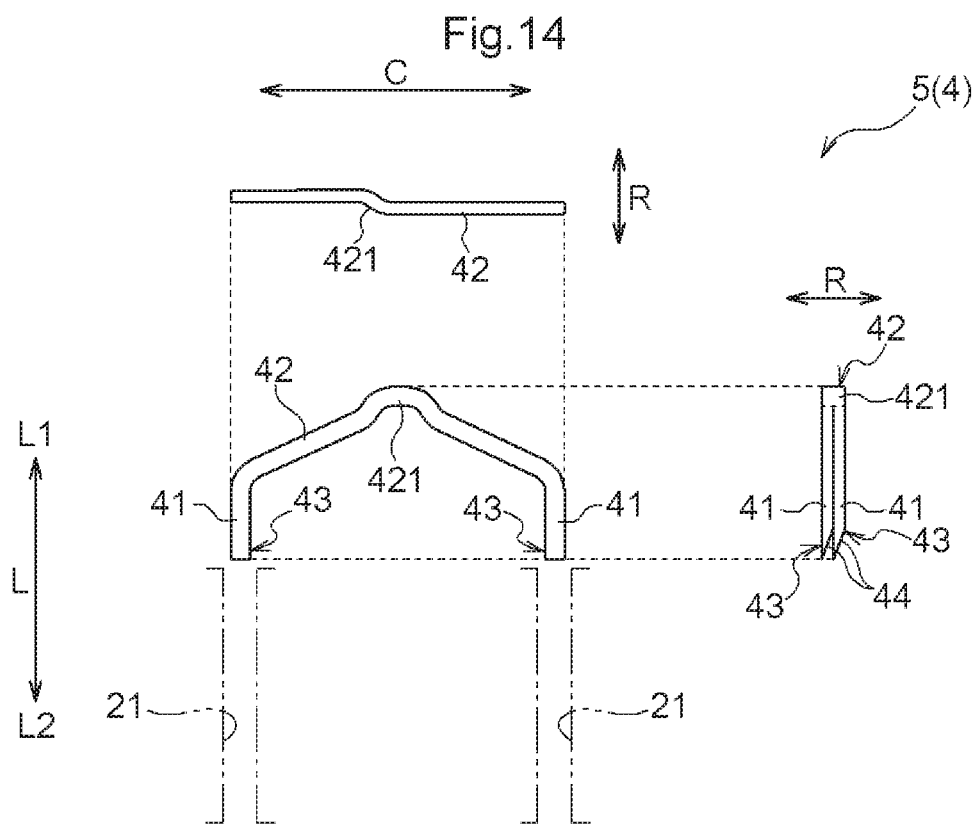
FIG. 14 illustrates one of a pair of segment conductors according to a different embodiment.
Figure 15:
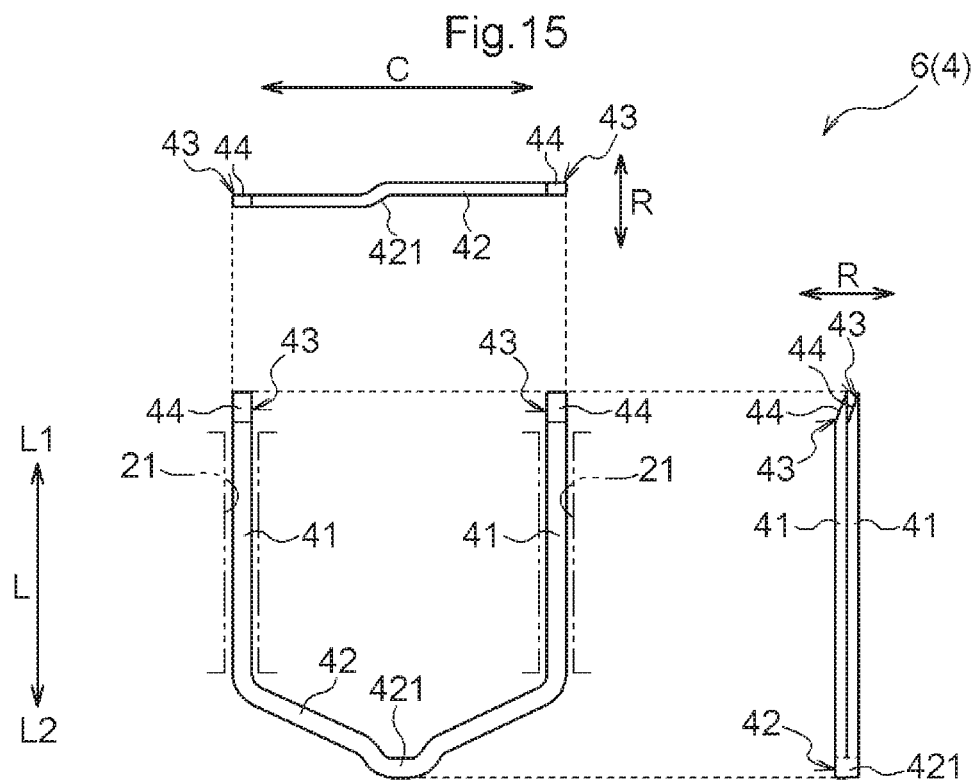
FIG. 15 illustrates the other of the pair of segment conductors according to the different embodiment.

In the example illustrated in FIGS. 14 and 15, the pair of conductor side portions 41 of the first segment conductor 5 have the same length in the axial direction L, and the pair of conductor side portions 41 of the second segment conductor 6 have the same length in the axial direction L. The conductor side portions 41 of the second segment conductor 6 are longer in the axial direction L than the conductor side portions 41 of the first segment conductor 5. The conductor side portions 41 of the second segment conductor 6 are longer in the axial direction L than the slots 21. In the case where the second segment conductor 6 is disposed in the slots 21, the joint portions 43 of the conductor side portions 41 are positioned on the first axial side L1 with respect to the end portions of the slots 21 (stator core 2) on the first axial side L1. In this manner, in the example illustrated in FIGS. 14 and 15, the joint portions 43 of the first segment conductor 5 and the joint portions 43 of the second segment conductor 6 are joined to each other outside the slot 21. With such a configuration, when the joint portions 43 are to be joined to each other, the joint portions 43 cannot be pressed toward the inner wall surface of the slot 21 on the radially outer side R2 (see FIG. 7). Therefore, it is suitable to use a jig etc. that has portions that face, from the radially outer side R2, the joint portions 43 of the pair of conductor side portions 41 positioned most on the radially outer side R2.

(3) In the embodiments described above, the stator 1 (see FIG. 4) according to the second embodiment described above is manufactured in the manufacturing process S1. However, the present disclosure is not limited thereto. It is only necessary that the method of manufacturing a rotary electric machine armature should manufacture a rotary electric machine armature in which at least facing surfaces formed so as to have a portion that faces the radial direction R are formed at joint portions of conductor side portions. Here, the wording "portion that faces the radial direction R" refers to a portion, the normal to which has a component in the radial direction R. Therefore, the method of manufacturing a rotary electric machine armature may manufacture a rotary electric machine armature that includes segment conductors, in which a load in the radial direction R can be received with only a relatively small range of the facing surfaces but the load in the radial direction R can be received with a part of such a range, as disclosed in Japanese Patent Application Publication No. 2015-023771 discussed above, for example.

(4) In the embodiments described above, the joint portions 43 of all the segment conductors 4 in all the slots 21 are pressed using the pressing device 9 to be joined in the pressing process S13 of the manufacturing process S1. However, the present disclosure is not limited thereto. For example, the pressing process S13 for the segment conductors 4 may be performed for each of the slots 21, and the joint process S14 may be performed for each of the slots 21.

(5) In the embodiments described above, the coil 3 includes a plurality of segment conductors 4 configured to be wound around the stator core 2 by lap winding. However, the present disclosure is not limited thereto. For example, the coil 3 may include a plurality of segment conductors 4 configured to be wound around the stator core 2 by wave winding.

(6) In the embodiments described above, the cross-sectional shape of the segment conductors 4 taken along a plane that is orthogonal to the extension direction is rectangular. However, the present disclosure is not limited thereto. The cross-sectional shape of the linear conductors may be a shape other than a rectangular shape. For example, the cross-sectional shape of the linear conductors may be a circular shape or an elliptical shape, and may be a polygonal shape such as a triangular shape, a pentagonal shape, or a shape with six or more sides.

(7) In the embodiments described above, the slots 21 extend in parallel with the axial direction L. However, the present disclosure is not limited thereto. It is also suitable if the slots 21 extend as inclined with respect to the axial direction L, either entirely or partially. Also in this case, the slots 21 are considered to extend in the axial direction L.

(8) In the embodiments described above, the conductive joint material 8 is disposed on at least one of the facing surfaces 44, which face each other, of the pair of segment conductors 4, and the pair of joint portions 43 (facing surfaces 44) are joined to each other using the conductive joint material 8. However, the present disclosure is not limited thereto. For example, the pair of joint portions 43 (facing surfaces 44) may be joined to each other by welding etc. without using a joint material.

(9) In the embodiments described above, the segment conductors 4 are formed in a U-shape as viewed in the radial direction R, and each have a pair of conductor side portions 41 and a crossover portion 42 that connects between the pair of conductor side portions 41. However, the shape of the segment conductors 4 is not limited thereto. For example, the segment conductors 4 may be formed in a J-shape, and each have one conductor side portion 41 and a crossover portion 42 connected to the conductor side portion 41.

(10) In the embodiments described above, the rotary electric machine armature is constituted as the stator 1 for a rotary electric machine of an inner rotor type. However, the present disclosure is not limited thereto. The rotary electric machine armature may be constituted as a stator 1 for a rotary electric machine of an outer rotor type. In this case, it is suitable if the radially opening portions 21a of the slots 21 of the stator core 2 open toward the radially outer side R2.

(11) The configuration disclosed in each of the embodiments discussed above may be applied in combination with a configuration disclosed in any other embodiment unless any contradiction occurs. Also regarding the other configurations, the embodiment disclosed herein is merely illustrative in all respects. Thus, a variety of alterations can be made, as appropriate, without departing from the scope and spirit of the present disclosure.

8. Overview of Above Embodiments

The overview of the rotary electric machine armature (1) described above and the method (S1) of manufacturing the same will be described below.

There is Provided a rotary electric machine armature (1) that includes a cylindrical armature core (2) in which a plurality of slots (21) that extend in an axial direction (L) are disposed in a circumferential direction (C) and a coil (3) wound around the armature core (2), in which:

the coil (3) is constituted by joining a plurality of segment conductors (4) to each other;

the segment conductors (4) have respective conductor side portions (41) that extend along the axial direction (L);

the conductor side portions (41) are provided with respective joint portions (43);

the joint portions (43) have respective facing surfaces (44);

the joint portions (43) of a pair of the segment conductors (4) are joined to each other with the facing surfaces (44) of the joint portions (43) facing each other; and the facing surface (44) is formed so as to have a portion that faces a radial direction (R) and so as not to have portions that overlap each other as viewed in the radial direction (R) over the entire facing surface (44).

With such a configuration, the pair of segment conductors (4) are shaped to be able to receive a load in the radial direction (R) with the entire facing surfaces (44) of the joint portions (43) which are joined to each other. Therefore, the pair of segment conductors (4) can be joined to each other by being pressed along the radial direction (R), rather than by being pressed in the axial direction (L). Hence, when the segment conductors (4) are to be joined to each other, application of a non-uniform pressing force to the plurality of segment conductors (4) can be suppressed and, further, application of a uniform pressing force to the plurality of segment conductors (4) is facilitated. Hence, a rotary electric machine armature (1) with a structure in which the segment conductors (4) can be easily joined to each other appropriately can be achieved.

There is Provided a rotary electric machine armature (1) that includes a cylindrical armature core (2) in which a plurality of slots (21) that extend in an axial direction (L) are disposed in a circumferential direction (C) and a coil (3) wound around the armature core (2), in which:

the coil (3) is constituted by joining a plurality of segment conductors (4) to each other;

the segment conductors (4) have respective conductor side portions (41) that extend along the axial direction (L);

the conductor side portions (41) are provided with respective joint portions (43);

the joint portions (43) have respective facing surfaces (44);

the joint portions (43) of a pair of the segment conductors (4) are joined to each other with the facing surfaces (44) of the joint portions (43) facing each other;

one of the facing surfaces (44) which face each other is constituted of only a surface that faces one side in a radial direction (R); and the other of the facing surfaces (44) which face each other is constituted of only a surface that faces the other side in the radial direction (R).

With such a configuration, the pair of segment conductors (4) are shaped to be able to receive a load in the radial direction (R) with the entire facing surfaces (44) of the joint portions (43) which are joined to each other. Therefore, the pair of segment conductors (4) can be joined to each other by being pressed along the radial direction (R), rather than by being pressed in the axial direction (L). Hence, when the segment conductors (4) are to be joined to each other, application of a non-uniform pressing force to the plurality of segment conductors (4) can be suppressed and, further, application of a uniform pressing force to the plurality of segment conductors (4) is facilitated. Hence, a rotary electric machine armature (1) with a structure in which the segment conductors (4) can be easily joined to each other appropriately can be achieved.

There is Provided a rotary electric machine armature (1) that includes a cylindrical armature core (2) in which a plurality of slots (21) that extend in an axial direction (L) are disposed in a circumferential direction (C) and a coil (3) wound around the armature core (2), in which:

the coil (3) is constituted by joining a plurality of segment conductors (4) to each other;

the segment conductors (4) have respective conductor side portions (41) that extend along the axial direction (L);

the conductor side portions (41) are provided with respective joint portions (43);

the joint portions (43) have respective facing surfaces (44);

the joint portions (43) of a pair of the segment conductors (4) are joined to each other with the facing surfaces (44) of the joint portions (43) facing each other; and the facing surface (44) is formed so as to have a portion that faces a radial direction (R) and so as not to have portions that overlap each other as viewed in the circumferential direction (C) over the entire facing surface (44).

With such a configuration, the pair of segment conductors (4) are shaped to be able to receive a load in the radial direction (R) with a relatively large range of the facing surfaces (44) of the joint portions (33) which are joined to each other. Therefore, the pair of segment conductors (4) can be joined to each other by being pressed along the radial direction (R), rather than by being pressed in the axial direction (L). Hence, when the segment conductors (4) are to be joined to each other, application of a non-uniform pressing force to the plurality of segment conductors (4) can be suppressed and, further, application of a uniform pressing force to the plurality of segment conductors (4) is facilitated. Hence, a rotary electric machine armature (1) with a structure in which the segment conductors (4) can be easily joined to each other appropriately can be achieved.

There is Provided a rotary electric machine armature (1) that includes a cylindrical armature core (2) in which a plurality of slots (21) that extend in an axial direction (L) are disposed in a circumferential direction (C) and a coil (3) wound around the armature core (2), in which:

the coil (3) is constituted by joining a plurality of segment conductors (4) to each other;

the segment conductors (4) have respective conductor side portions (41) that extend along the axial direction (L);

the conductor side portions (41) are provided with respective joint portions (43);

the joint portions (43) have respective facing surfaces (44);

the joint portions (43) of a pair of the segment conductors (4) are joined to each other with the facing surfaces (44) of the joint portions (43) facing each other; and the facing surface (44) is formed so as to have a portion that faces a radial direction (R) and so as not to have a portion projecting or dented in the axial direction (L) in the facing surface (44).

With such a configuration, the pair of segment conductors (4) are shaped to be able to receive a load in the radial direction (R) with the entire facing surfaces (44) of the joint portions (43) which are joined to each other. Therefore, the pair of segment conductors (4) can be joined to each other by being pressed along the radial direction (R), rather than by being pressed in the axial direction (L). Hence, when the segment conductors (4) are to be joined to each other, application of a non-uniform pressing force to the plurality of segment conductors (4) can be suppressed and, further, application of a uniform pressing force to the plurality of segment conductors (4) is facilitated. Hence, a rotary electric machine armature (1) with a structure in which the segment conductors (4) can be easily joined to each other appropriately can be achieved.

Preferably, the segment conductors (4) further have respective crossover portions (42) disposed on an outer side of the armature core (2) in the axial direction (L);

the conductor side portions (41) are disposed in the slots (21); and the joint portions (43) of a pair of the segment conductors (4) are joined to each other in the slots (21).

In this configuration, the joint portions (43) of the pair of segment conductors (4) are joined to each other in the slots (21). Therefore, in the case where the pair of segment conductors (4) are to be joined to each other by being pressed along the radial direction (R), the segment conductors (4) can be supported by the inner wall surfaces of the slots (21). Thus, application of a uniform pressing force to the plurality of segment conductors (4) in the slots (21) is facilitated.

Preferably, the slots (21) have respective radially opening portions (21a) that open in the radial direction (R); and a width of the radially opening portion (21a) in the circumferential direction (C) is smaller than a width, in the circumferential direction (C), of a region of the slot (21) in which the conductor side portions (41) are disposed.

With this configuration, the amount of magnetic flux generated by a field and reaching the conductor side portions (41) which constitute the coil (3) can be reduced by an amount corresponding to the small width of the radially opening portion (21a) in the circumferential direction (C). Thus, an eddy current loss can be reduced by suppressing generation of an eddy current in the conductor side portions (41), and the energy efficiency of the rotary electric machine can be improved. In this configuration, in addition, the width of the radially opening portion (21a) in the circumferential direction (C) is small, and the width of the distal end portions (22a) of the teeth (22) in the circumferential direction (C) is large. Therefore, variations in magnetic flux between adjacent teeth (22) in the circumferential direction (C) can be suppressed to be small. Thus, torque ripple of the rotary electric machine can be suppressed to be low.

Preferably, the facing surfaces (44) each include a first inclined surface (441) that extends along a direction inclined with respect to the axial direction (L), and a second inclined surface (442) that extends along a direction that intersects the direction in which the first inclined surface (441) extends; and the second inclined surface (442) is formed so as to overlap the first inclined surface (441) as viewed in the axial direction (L).

In this configuration, a projection and a recess are formed on the facing surfaces (44) by the first inclined surface (441) and the second inclined surface (442). Therefore, when the segment conductors (4) are to be joined to each other, the joint portions (43) can be guided to appropriate positions through meshing between the projection and the recess by being pressed along the radial direction (R), even in the case where the joint portions (43) to be joined to each other are displaced from the appropriate positions. In addition, separation of the joint portions (43), which are to be joined to each other, from each other along the axial direction (L) can be regulated through meshing between the projection and the recess. Thus, a rotary electric machine armature (1) with a structure in which the segment conductors (4) can be easily joined to each other further appropriately can be achieved.

Preferably, a pair of the conductor side portions (41) have different lengths in the axial direction (L).

With this configuration, the joint portions (43) of the conductor side portions (41), which are adjacent to each other in the radial direction (R), can be easily displaced from each other in the axial direction (L). Thus, the process of insulating the joint portions (43) can be simplified, which reduces the manufacturing cost.

There is Provided a method (S1) of manufacturing a rotary electric machine armature (1) that includes an armature core (2) in which a plurality of slots (21) that extend in an axial direction (L) of a cylindrical core reference surface (S) are disposed in a distributed manner in a circumferential direction (C) of the core reference surface (S) and a coil (3) wound around the armature core (2), the slots (21) having respective radially opening portions (21a) that open in a radial direction (R) of the core reference surface (S), and the coil (3) being constituted by joining a plurality of segment conductors (4) to each other, the method (S1) including:

a preparation step (S11) of preparing a plurality of the segment conductors (4) and preparing the armature core (2), the segment conductors (4) having respective conductor side portions (41) extending along the axial direction (L) and disposed in the slots (21) and respective crossover portions (42) disposed on an outer side of the armature core (2) in the axial direction (L) to connect between a pair of the conductor side portions (41), the conductor side portions (41) being provided with respective joint portions (43) at end portions thereof on the opposite side from the portions of connection with the crossover portions (42), and the joint portions (43) having respective facing surfaces (44) formed so as to have a portion that faces the radial direction (R);

an arrangement step (12) of arranging, when the segment conductor (4), among the plurality of segment conductors (4), the crossover portion (42) of which is disposed on one side in the axial direction (L) with respect to the armature core (2), is defined as a first segment conductor (5) and the segment conductor (4), the crossover portion (42) of which is disposed on the other side in the axial direction (L) with respect to the armature core (2), is defined as a second segment conductor (6), the conductor side portions (41) of the first segment conductor (5) and the conductor side portions (41) of the second segment conductor (6) in the slots (21) such that the facing surface (44) of one of the joint portions (43) of the first segment conductor (5) and the facing surface (44) of one of the joint portions (43) of the second segment conductor (6) face each other in the radial direction (R);

a pressing step (S13) of pressing a portion, at which the joint portions (43) of the first segment conductor (5) and the joint portions (43) of the second segment conductor (6) overlap each other as viewed in the radial direction (R), from the radially opening portion (21a); and a joint step (S14) of joining the joint portions (43) of the first segment conductor (5) and the joint portions (43) of the second segment conductor (6) to each other while maintaining a pressing state in the pressing step (S13).

With such a configuration, the first segment conductor (5) and the second segment conductor (6) can be joined to each other in the state of being pressed along the radial direction (R) from the radially opening portion (21a), rather than by being pressed in the axial direction (L). Therefore, when the segment conductors (4) are to be joined to each other, application of a non-uniform pressing force to the plurality of segment conductors (4) in the slots (21) can be suppressed. Thus, the segment conductors (4) can be easily joined to each other appropriately with a uniform pressing force applied to the plurality of segment conductors (4) in the slots (21).

Preferably, a width of the radially opening portion (21a) in the circumferential direction (C) is smaller than a width, in the circumferential direction (C), of a region of the slot (21) in which the conductor side portions (41) are disposed.

With this configuration, the amount of magnetic flux generated by a field and reaching the conductor side portions (41) which constitute the coil (3) when the rotary electric machine is used can be reduced by an amount corresponding to the small width of the radially opening portion (21a) in the circumferential direction (C). Thus, an eddy current loss can be reduced by suppressing generation of an eddy current in the conductor side portions (41), and the energy efficiency of the rotary electric machine can be improved. In this configuration, in addition, the width of the radially opening portion (21a) in the circumferential direction (C) is small, and the width of the distal end portions (22a) of the teeth (22) in the circumferential direction (C) is large. Therefore, variations in magnetic flux between adjacent teeth (22) in the circumferential direction (C) can be suppressed to be small. Thus, torque ripple of the rotary electric machine can be suppressed to be low.

Preferably, a conductive joint material (8) is disposed on at least one of the facing surfaces (44) of the first segment conductor (5) and the facing surfaces (44) of the second segment conductor (6), which face each other, before the arrangement step (S12).

With this configuration, the first segment conductor (5) and the second segment conductor (6) can be joined to each other easily and appropriately while securing good conductivity.

Preferably, the plurality of segment conductors (4) are disposed in all the slots (21) of the armature core (2) in the arrangement step (S12); and all the joint portions (43) of the plurality of segment conductors (4) in all the slots (21) are pressed in the pressing step (S13).

With this configuration, the time required for the manufacturing process (S1) for the rotary electric machine armature (1) can be shortened.

INDUSTRIAL APPLICABILITY

The technology according to the present disclosure can be utilized for a rotary electric machine armature that includes a cylindrical armature core in which a plurality of slots that extend in the axial direction are disposed in the circumferential direction and a coil wound around the armature core.

The invention claimed is:
1. A rotary electric machine armature comprising:
a cylindrical armature core in which a plurality of slots that extend in an axial direction are disposed in a circumferential direction; and
a coil wound around the armature core, wherein:
the coil is formed by joining a plurality of segment conductors to each other;
the segment conductors have respective conductor side portions that extend along the axial direction;
the conductor side portions are provided with respective joint portions;
the joint portions have respective facing surfaces;
the joint portions of a pair of the segment conductors are joined to each other with the facing surfaces of the joint portions facing each other;
a facing surface of the facing surfaces is formed so as to have a portion that faces a radial direction and so as not to have portions that overlap each other as viewed in the radial direction over the entire facing surface;
a plurality of the conductor side portions is arranged in the radial direction within each one of the slots;
a conductive joint material is disposed on at least one of the facing surfaces of the joint portions facing each other; and
an axial length of the facing surfaces is shorter than an axial length of the armature core.

2. The rotary electric machine armature according to claim 1, wherein:
the segment conductors further have respective crossover portions disposed on an outer side of the armature core in the axial direction;
the conductor side portions are disposed in the slots; and
the joint portions of a pair of the segment conductors are joined to each other in the slots.

3. The rotary electric machine armature according to claim 1, wherein:
the slots have respective radial openings that open in the radial direction; and
a width of the radial openings in the circumferential direction is smaller than a width, in the circumferential direction, of a region of the slot in which the conductor side portions are disposed.

4. The rotary electric machine armature according to claim 1, wherein:
the facing surfaces each include a first inclined surface that extends along a direction inclined with respect to the axial direction, and a second inclined surface that extends in a direction that intersects the direction in which the first inclined surface extends; and
the second inclined surface is formed so as to overlap the first inclined surface as viewed in the axial direction.

5. The rotary electric machine armature according to claim 1, wherein
a pair of the conductor side portions have different lengths in the axial direction.

6. A rotary electric machine armature comprising:
a cylindrical armature core in which a plurality of slots that extend in an axial direction are disposed in a circumferential direction; and
a coil wound around the armature core, wherein:
the coil is formed by joining a plurality of segment conductors to each other;
the segment conductors have respective conductor side portions that extend along the axial direction;
the conductor side portions are provided with respective joint portions;
the joint portions have respective facing surfaces;
the joint portions of a pair of the segment conductors are joined to each other with the facing surfaces of the joint portions facing each other;
one of the facing surfaces which face each other is formed of only a surface that faces one side in a radial direction;
the other of the facing surfaces which face each other is formed of only a surface that faces the other side in the radial direction;
a plurality of the conductor side portions is arranged in the radial direction within each one of the slots;
a conductive joint material is disposed on at least one of the facing surfaces of the joint portions facing each other; and
an axial length of the facing surfaces is shorter than an axial length of the armature core.

7. The rotary electric machine armature according to claim 6, wherein:
the segment conductors further have respective crossover portions disposed on an outer side of the armature core in the axial direction;
the conductor side portions are disposed in the slots; and
the joint portions of a pair of the segment conductors are joined to each other in the slots.

8. The rotary electric machine armature according to claim 6, wherein:
the slots have respective radial openings that open in the radial direction; and
a width of the radial openings in the circumferential direction is smaller than a width, in the circumferential direction, of a region of the slot in which the conductor side portions are disposed.

9. The rotary electric machine armature according to claim 6, wherein:
the facing surfaces each include a first inclined surface that extends along a direction inclined with respect to the axial direction, and a second inclined surface that extends in a direction that intersects the direction in which the first inclined surface extends; and
the second inclined surface is formed so as to overlap the first inclined surface as viewed in the axial direction.

10. The rotary electric machine armature according to claim 6, wherein
a pair of the conductor side portions have different lengths in the axial direction.

11. A method of manufacturing a rotary electric machine armature that includes a cylindrical armature core in which a plurality of slots that extend in an axial direction are disposed in a circumferential direction and a coil wound around the armature core, the slots having respective radial openings that open in a radial direction, and the coil being formed by joining a plurality of segment conductors to each other, the method comprising:
preparing a plurality of the segment conductors and preparing the armature core, the segment conductors having respective conductor side portions extending along the axial direction and disposed in the slots and respective crossover portions disposed on an outer side of the armature core in the axial direction, the conductor side portions being provided with respective joint portions, and the joint portions having respective facing surfaces formed so as to have a portion that faces the radial direction;
arranging the conductor side portions of a first segment conductor and the conductor side portions of a second segment conductor in the slots such that the facing surface of one of the joint portions of the first segment conductor and the facing surface of one of the joint portions of the second segment conductor face each other in the radial direction, wherein:
the first segment conductor is the segment conductor among the plurality of segment conductors where the crossover portion is disposed on one side in the axial direction with respect to the armature core, and
the second segment conductor is the segment conductor among the plurality of segment conductors where the crossover portion is disposed on the other side in the axial direction with respect to the armature core;
pressing a portion, at which the joint portions of the first segment conductor and the joint portions of the second segment conductor overlap each other as viewed in the radial direction, from a radial opening of the radial openings; and
joining the joint portions of the first segment conductor and the joint portions of the second segment conductor to each other while maintaining a pressing state, wherein:
a plurality of the conductor side portions is arranged in the radial direction within each one of the slots;
a conductive joint material disposed on at least one of the facing surfaces of the first segment conductor and the facing surfaces of the second segment conductor, which face each other, before the arranging step; and
an axial length of the facing surfaces is shorter than an axial length of the armature core.

12. The method of manufacturing according to claim 11, wherein
a width of a radial opening of the radial openings in the circumferential direction is smaller than a width, in the circumferential direction, of a region of the slot in which the conductor side portions are disposed.

13. The method of manufacturing according to claim 11, wherein:
the plurality of segment conductors are disposed in all the slots of the armature core in the arranging step; and
all the joint portions of the plurality of segment conductors in all the slots are pressed in the pressing step.

* * * * *